(12) United States Patent
Goto et al.

(10) Patent No.: US 12,491,632 B2
(45) Date of Patent: Dec. 9, 2025

(54) DATA PROCESSING DEVICE, DATA PROCESSING METHOD, AND COOKING ROBOT

(71) Applicant: SONY GROUP CORPORATION, Tokyo (JP)

(72) Inventors: Norifumi Goto, Tokyo (JP); Masahiro Otsuka, Kanagawa (JP); Kenichi Seta, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 323 days.

(21) Appl. No.: 17/636,220

(22) PCT Filed: Sep. 23, 2020

(86) PCT No.: PCT/JP2020/035753
§ 371 (c)(1),
(2) Date: Feb. 17, 2022

(87) PCT Pub. No.: WO2021/065609
PCT Pub. Date: Apr. 8, 2021

(65) Prior Publication Data
US 2022/0331957 A1    Oct. 20, 2022

(30) Foreign Application Priority Data
Oct. 3, 2019    (JP) ................................. 2019-183084

(51) Int. Cl.
*B25J 9/16*    (2006.01)
*A47J 36/32*    (2006.01)
(Continued)

(52) U.S. Cl.
CPC ............. *B25J 9/1664* (2013.01); *A47J 36/32* (2013.01); *B25J 11/0045* (2013.01); *B25J 13/08* (2013.01);
(Continued)

(58) Field of Classification Search
None
See application file for complete search history.

(56) References Cited

U.S. PATENT DOCUMENTS 6,255,630 B1 *  7/2001  Barnes .................... F24C 7/082
                                                       219/486
10,429,839 B2 * 10/2019  Liu ....................... G05D 1/0088
(Continued)

FOREIGN PATENT DOCUMENTS

JP       2002-504724 A       2/2002
JP       2004301796 A   *   10/2004
(Continued)

*Primary Examiner* — Jason Holloway
*Assistant Examiner* — Atticus A Cameron
(74) *Attorney, Agent, or Firm* — Paratus Law Group, PLLC

(57) ABSTRACT

There is provided a data processing device, a data processing method, and a cooking robot that allow for object sensing with use of an appropriate algorithm. The data processing device according to one aspect of the present technology adaptively selects, in accordance with an object sensing condition, and executes an object sensing program in which an object sensing algorithm for sensing an object on the basis of sensor data output from a sensor mounted on a robot is defined. The present technology can be applied to sensor devices mounted on various devices.

18 Claims, 40 Drawing Sheets

(51) Int. Cl.
    *B25J 11/00*           (2006.01)
    *B25J 13/08*           (2006.01)
    *G01B 21/00*          (2006.01)
    *G01C 3/06*            (2006.01)
    *G05B 19/4155*       (2006.01)
    *G06F 8/65*            (2018.01)
    *G06F 9/445*          (2018.01)

(52) U.S. Cl.
    CPC ........... *G05B 19/4155* (2013.01); *G06F 8/65* (2013.01); *G05B 2219/50391* (2013.01)

(56) References Cited

U.S. PATENT DOCUMENTS

| | | | |
|---|---|---|---|
| 2015/0019012 A1* | 1/2015 | Yoshida | B25J 9/163 |
| | | | 700/248 |
| 2020/0015623 A1* | 1/2020 | Kim | A23L 5/10 |
| 2022/0142397 A1* | 5/2022 | Fujita | A61B 5/389 |

FOREIGN PATENT DOCUMENTS

| | | | | |
|---|---|---|---|---|
| JP | 2005326387 A | * | 11/2005 | ............ G01B 11/14 |
| JP | 2007-286850 A | | 11/2007 | |
| JP | 2009-037419 A | | 2/2009 | |
| JP | 2010-162554 A | | 7/2010 | |
| JP | 2013235306 A | * | 11/2013 | |
| JP | 2016-047752 A | | 4/2016 | |
| JP | 2017-536247 A | | 12/2017 | |
| WO | WO 2013/150599 A1 | | 10/2013 | |

\* cited by examiner

FIG. 27

| SENSING ALGORITHM | DESCRIPTION |
|---|---|
| A1 | HIGHLY RESPONSIVE ALGORITHM CAPABLE OF IMMEDIATELY OUTPUTTING ALERT WHEN MOVING OBJECT COMES INTO VIEW |
| A2 | ALGORITHM THAT HAS SUFFICIENT ACCURACY (IN MILLIMETERS) TO DETERMINE UNIFORMITY. RESPONSIVENESS IS LOW |
| A3 | ALGORITHM CAPABLE OF MEASURING DISTANCE TO WATER SURFACE |
| A4 | ALGORITHM CAPABLE OF MEASUREMENT EVEN IN SITUATION WITH STEAM |
| A5 | ALGORITHM CAPABLE OF MEASURING DISTANCE TO TRANSPARENT UTENSIL |
| A6 | ALGORITHM CAPABLE OF MEASURING DISTANCE TO HIGHLY REFLECTIVE UTENSIL |
| A7 | ALGORITHM THAT MEASURES DISTANCE BY USING OUTPUT FROM ToF SENSOR OR LIKE, OTHER THAN RGB IMAGES |

FIG. 28

| SENSING ALGORITHM | DESCRIPTION |
|---|---|
| A11 | ALGORITHM THAT DETERMINES WHETHER DISH IS IN JAPANESE STYLE, WESTERN STYLE, OR CHINESE STYLE |
| A12 | ALGORITHM THAT DETERMINES BEAUTY OF JAPANESE STYLE DISH |
| A13 | ALGORITHM THAT DETERMINES BEAUTY OF WESTERN STYLE DISH |
| A14 | ALGORITHM THAT DETERMINES BEAUTY OF CHINESE STYLE DISH |

FIG. 29

| SENSING ALGORITHM | DESCRIPTION |
|---|---|
| A21 | ALGORITHM THAT DETERMINES TYPE OF UTENSIL WITH HIGH ACCURACY |
| A22 | ALGORITHM THAT DETERMINES TYPE OF UTENSIL WITH ROUGH ACCURACY |
| A23 | ALGORITHM THAT DETERMINES TYPE OF TARGET OBJECT (HUMAN HAND, PLATE, SPOON, KNIFE, OR LIKE) |
| A24 | ALGORITHM THAT DETERMINES DEGREE OF DIRT ON HAND |
| A25 | ALGORITHM THAT RECOGNIZES HAND OF INDIVIDUAL |
| A26 | ALGORITHM FOR DETERMINING DRYNESS OF HAND |
| A27 | ALGORITHM THAT DETERMINES DIRT ON TABLEWARE (PLATE OR SPOON) |
| A28 | ALGORITHM FOR DETERMINING DRYNESS OF TABLEWARE |
| A29 | ALGORITHM THAT DETERMINES GREASE ON COOKING TOOL (KNIFE) |
| A30 | ALGORITHM THAT DETERMINES SOLID DIRT ON COOKING TOOL (KNIFE) |
| A31 | ALGORITHM FOR DETERMINING DRYNESS OF COOKING TOOL (KNIFE) |
| A32 | ALGORITHM FOR DETERMINING DIRT ON COOKING TOOL (WOODEN CHOPPING BLOCK) |
| A33 | ALGORITHM FOR DETERMINING DRYNESS ON COOKING TOOL (WOODEN CHOPPING BLOCK) |

FIG. 30

| OPERATION | SENSING ALGORITHM THAT CAN BE USED | USE CASE | TRANSITION |
|---|---|---|---|
| COOKING | A1, A2, A3, A4 | COOKING: CUT INGREDIENT | A1 |
| | | COOKING: APPLY CREAM TO CAKE | A1 => A2 |
| | | COOKING: PUT INGREDIENT INTO POT FILLED WITH COLD OR HOT WATER | A1 => A3, A4 |
| ARRANGEMENT | A1, A5, A6, A7 | ARRANGEMENT: ARRANGE ON TRANSPARENT UTENSIL | A5 |
| | | ARRANGEMENT: ARRANGE ON HIGHLY REFLECTIVE UTENSIL (METAL) | A6 |
| | | ARRANGEMENT: ARRANGE ON UTENSIL OR LIQUID HAVING UNIFORM COLOR | A7 |
| | A11, A12, A13, A14 | ARRANGEMENT OF DISH: DETERMINE BEAUTY | A11 <=> A12 <=> A13 <=> A14 |
| | A21 | PLATE RECOGNITION: CHECK WHETHER PLATE IS CORRECT (CORRESPONDING PLATE FOR JAPANESE STYLE, WESTERN STYLE, OR CHINESE STYLE) BEFORE ARRANGEMENT | A21 |
| CLEANUP | A21, A22 | PLATE RECOGNITION: DETERMINE KIND AND MATERIAL OF PLATE, WASH PLATE WITH APPROPRIATE WASHING METHOD, AND THEN CLEAN UP | A22 => A21 |

FIG. 31

| OPERATION | USE CASE | TRANSITION |
|---|---|---|
| CLEANUP (CURRY) | CHEF WASHES HANDS | A23 => A24 => A25 => A26 |
| | REMOVE DIRT FROM PLATE | A23 => A27 => A28 |
| | WASH SPOON | A23 => A27 => A28 |
| | WASH KNIFE | A23 => A30 => A31 |
| | REMOVE GREASE FROM KNIFE | A23 => A25 => A31 |
| | WASH CHOPPING BLOCK | A23 => A32 => A33 |
| | WASH DIRTY SPOON AND PLATE | A23 => A27 => A28 | ively changing software of a device that performs
DATA PROCESSING DEVICE, DATA PROCESSING METHOD, AND COOKING ROBOT

CROSS REFERENCE TO PRIOR APPLICATION

This application is a National Stage Patent Application of PCT International Patent Application No. PCT/JP2020/035753 (filed on Sep. 23, 2020) under 35 U.S.C. § 371, which claims priority to Japanese Patent Application No. 2019-183084 (filed on Oct. 3, 2019), which are all hereby incorporated by reference in their entirety.

TECHNICAL FIELD

In particular, the present technology relates to a data processing device, a data processing method, and a cooking robot that allow for object sensing with use of an appropriate algorithm.

BACKGROUND ART

Conventionally, various technologies for updating software of a device have been proposed from the viewpoint of adding a function and securing compatibility with other devices.

For example, Patent Document 1 discloses a technology for determining a service that becomes available by a combination of a camera and a communication device, and installing software that provides the service.

Furthermore, Patent Document 2 discloses a technology for updating firmware between an imaging device and a host system in a case where it has been detected that firmware on the imaging device is incompatible with the host system.

CITATION LIST

Patent Document

Patent Document 1: Japanese Patent Application Laid-Open No. 2007-286850
Patent Document 2: Japanese Unexamined Patent Application Publication (Translation of PCT Application) No. 2002-504724

SUMMARY OF THE INVENTION

Problems to be Solved by the Invention

Although various technologies for changing software of an imaging device such as a camera have been disclosed, adaptively changing software of a device that performs sensing in accordance with a situation as a sensing target or the like has not been disclosed.

The present technology has been made in view of such circumstances, and is intended to allow for object sensing with use of an appropriate algorithm.

Solutions to Problems

A first aspect of the present technology provides a data processing device including a sensing control unit configured to adaptively select, in accordance with an object sensing condition, and execute an object sensing program in which an object sensing algorithm for sensing an object on the basis of sensor data output from a sensor mounted on a robot is defined.

A second aspect of the present technology provides a data processing device including a data processing unit configured to adaptively select, in accordance with an object sensing condition, an object sensing program in which an object sensing algorithm for sensing an object on the basis of sensor data output from a sensor mounted on a robot is defined, and transmit the object sensing program to the robot.

A third aspect of the present technology provides a cooking robot including: a sensor configured to output sensor data showing a sensing result; a sensing control unit configured to adaptively select, in accordance with an object sensing condition, and execute an object sensing program in which an object sensing algorithm for sensing an object on the basis of the sensor data output from the sensor is defined; and a cooking operation plan setting unit configured to set an operation plan of a cooking operation by a cooking arm on the basis of a result of execution of the object sensing program by the sensing control unit; and a cooking operation unit configured to perform the cooking operation in accordance with the operation plan set by the cooking operation plan setting unit.

In the first aspect of the present technology, the object sensing program in which the object sensing algorithm for sensing an object on the basis of sensor data output from the sensor mounted on the robot is defined is adaptively selected in accordance with the object sensing condition and executed.

In the second aspect of the present technology, the object sensing program in which the object sensing algorithm for sensing an object on the basis of sensor data output from the sensor mounted on the robot is defined is adaptively selected in accordance with the object sensing condition, and the object sensing program is transmitted to the robot.

In the third aspect of the present technology, the object sensing program in which the object sensing algorithm for sensing an object on the basis of sensor data output from the sensor that outputs sensor data showing a sensing result is defined is adaptively selected in accordance with the object sensing condition and executed, the operation plan of the cooking operation by the cooking arm is set on the basis of an execution result of the object sensing program, and the cooking operation is performed in accordance with the operation plan that has been set.

BRIEF DESCRIPTION OF DRAWINGS

FIG. 27 is a diagram illustrating an example of a sensing algorithm.

FIG. 28 is a diagram illustrating another example of the sensing algorithm.

FIG. 29 is a diagram illustrating still another example of the sensing algorithm.

FIG. 30 is a diagram illustrating an example of the sensing algorithm in accordance with a cooking operation.

FIG. 31 is a diagram illustrating another example of transition of the sensing algorithm in accordance with the cooking operation.

MODE FOR CARRYING OUT THE INVENTION

<Outline of Present Technology>

The present technology focuses on a point that factors as described below make it difficult to perform sensing with use of an optimal algorithm in a sensor device mounted on various devices such as a robot, a mobile object, and a smartphone, and achieves a solution thereof.

Factors

There are many types of underlying technologies.

Underlying technologies vary in maturity.

There are many variations in cost.

There is a wide variety of usages.

System design and implementation are challenging.

There are many types of user requests.

There are many implementation constraints such as processor power, power consumption, and circuit size.

There are many types of sensing targets.

In particular, the present technology allows a sensor device that performs object sensing to perform sensing with use of an optimal algorithm as a sensing algorithm, which is an algorithm related to sensing.

A mode for carrying out the present technology will be described below. The description will be made in the order below.

1. Program provision system
2. Use case of sensing program
3. Configuration of each device
4. Operation of cooking robot
5. Modified examples <Program Provision System>

System Configuration

Figure 1:
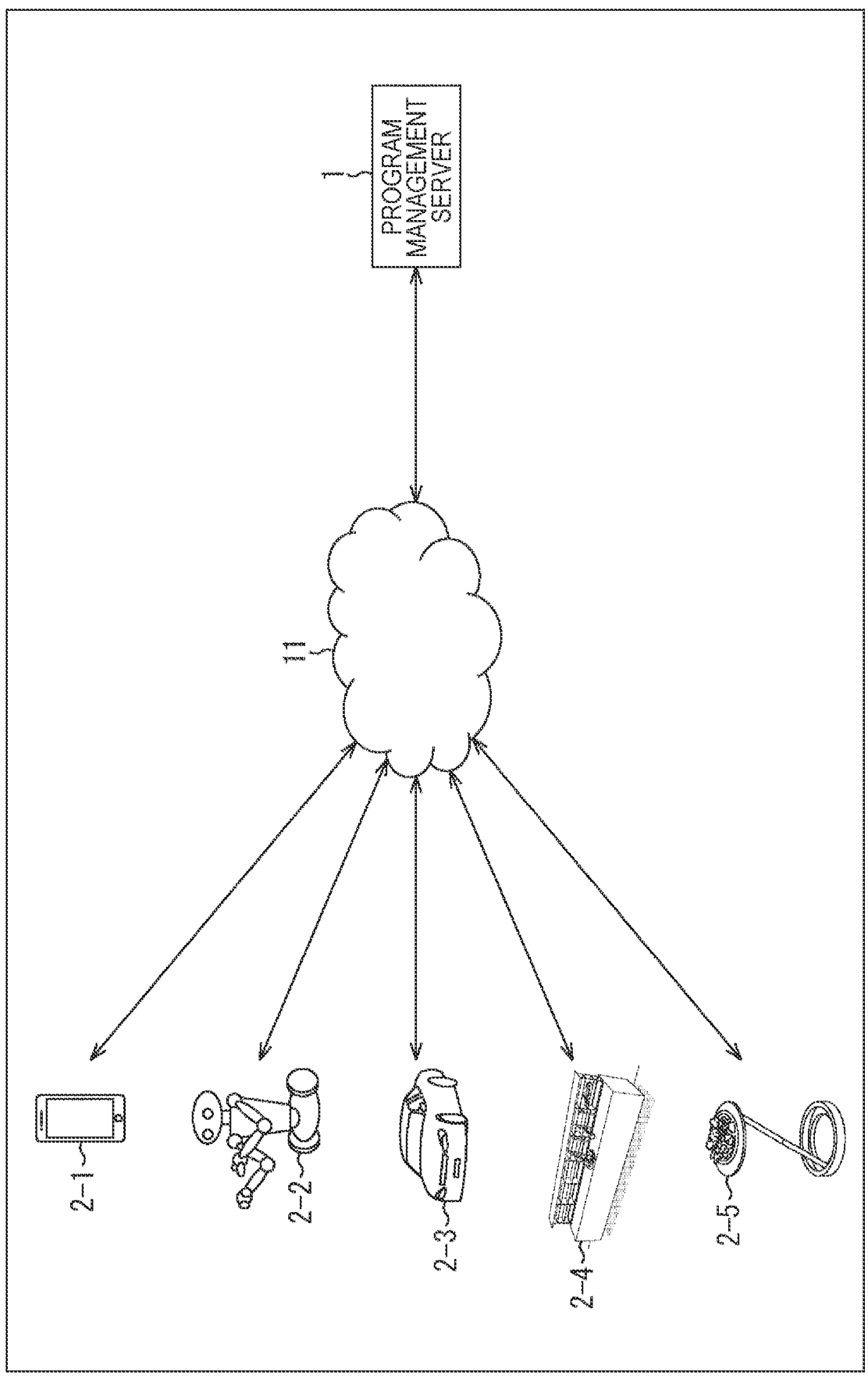
FIG. 1 is a diagram illustrating a configuration example of a program provision system according to one embodiment of the present technology.

FIG. 1 is a diagram illustrating a configuration example of a program provision system according to one embodiment of the present technology.

The program provision system in FIG. 1 has a configuration in which various devices such as a mobile terminal 2-1, an arm robot 2-2, a mobile object 2-3, a cooking robot. 2-4, and a conveyance robot 2-5 are connected to a program management server 1 via a network 11 constituted by the Internet or the like.

The mobile terminal 2-1 is a smartphone.

The arm robot 2-2 is a dual-arm robot. The arm robot 2-2 has a housing disposed with a carriage. The arm robot 2-2 is a movable robot.

The mobile object 2-3 is an automobile. The mobile object 2-3 has an automated driving function and the like.

The cooking robot 2-4 is a kitchen type robot. The cooking robot 2-4 has a function of performing cooking by driving a plurality of cooking arms. The cooking arms reproduce as operation similar to a cooking operation performed by a human.

The conveyance robot 2-S is capable of placing an object to be conveyed on a top plate prepared as a mounting table and moving to a desired position is this state. The conveyance robot 2-5 has a wheeled base portion.

A sensor device used for environment sensing, object sensing, human sensing, or the like is mounted on each device illustrated in FIG. 1.

Figure 2:
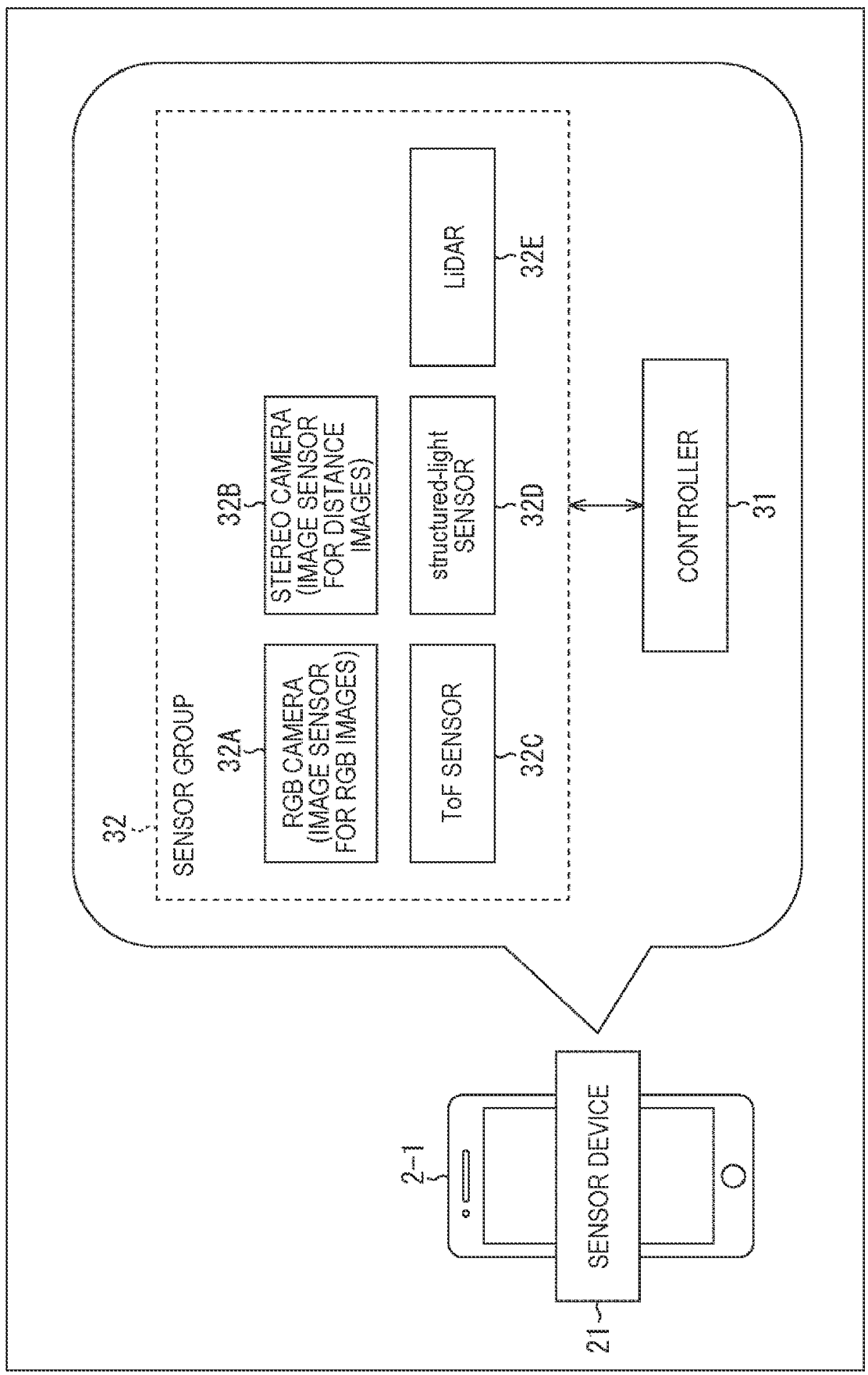
FIG. 2 is a diagram illustrating a configuration example of a sensor device.

FIG. 2 is a diagram illustrating a configuration example of the sensor device.

As illustrated in FIG. 2, a sensor device 21 is disposed with a controller 31 and a sensor group 32.

The controller 31 controls each sensor constituting the sensor group 32 to perform sensing of various targets such as environment sensing, object sensing, and human sensing. Sensing by the controller 31 is performed on the basis of sensor data output from each sensor constituting the sensor group 32.

The controller 31 outputs a result of the sensing to a host side device. Various types of processing are performed in the host side device on the basis of the result of the sensing by the controller 31. In a case where the sensor device 21 is mounted on the mobile terminal 2-1, a central processing unit (CPU) of the mobile terminal 2-1 serves as a host side device. The controller 31 also has a function of communicating with the host side device.

The sensor group 32 is constituted by a plurality of sensors that perform sensing of various targets. In the example in FIG. 2, the sensor group 32 is constituted by an RGB camera 32A, a stereo camera 32B, a ToF sensor 32C, a structured-light sensor 32D, and a LiDAR 32E.

The RGB camera 32A has an image sensor for RGB images. The RGB camera 32A drives the image sensor to image a state of surroundings, and outputs an RGB image obtained by the imaging as sensor data.

The stereo camera 32B is a distance sensor using a stereo camera system, and has two image sensors for distance images. The stereo camera 32B outputs a distance image showing a distance to a target object as sensor data.

The ToF sensor 325 is a distance sensor using a time of flight. (ToF) system. The ToF sensor 325 measures the distance to the target object by the ToF method, and outputs distance information as sensor data.

The structured-light sensor 32D is a distance sensor using a structured-light method. The structured-light sensor 32D measures the distance to the target object by the structured-light method, and outputs distance information as sensor data.

A light detection and ranging (LiDAR) 32E measures a three-dimensional position of each point of the target object, and outputs information showing a measurement result as sensor data.

Sensors different from the sensors illustrated in FIG. 2, such as a positioning sensor, a gyro sensor, an acceleration sensor, a temperature sensor, and an illuminance sensor, may be included in the sensor group 32.

The types of the sensors constituting the sensor group 32 are changed as appropriate depending on the device on which the sensor device 21 mounted. The sensor group 32 may be configured by one sensor.

Figure 3:
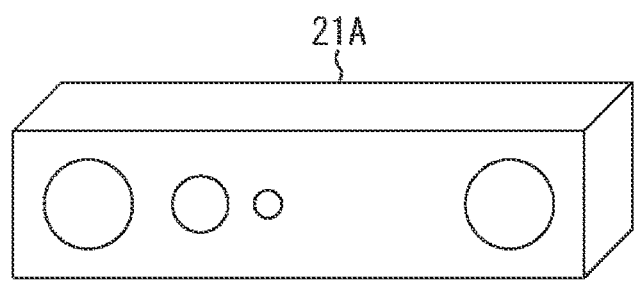
FIG. 3 is a diagram illustrating an example of an appearance of the sensor device.

The sensor device 21 may be constituted by a substrate on which the controller 31 and the sensor group 32 are disposed, or may be configured as a device in which a substrate on which each sensor is disposed is housed in a housing 21A as illustrated in FIG. 3.

In the sensor device 21 having such a configuration, the controller 31 executes a sensing program, which is a program for sensing, and implements a sensing function for various targets such as an environment, an object, and a human. The sensing function of the controller 31 is implemented on the basis of an output of one sensor constituting the sensor group 32, or on the basis of a combination of outputs of a plurality of sensors.

Environment sensing (sensing of an environment) includes, for example, the following.
  Capturing of an RGB image with use of the RGB camera 32A
  Measurement of the distance to the target object with use of an output of the stereo camera 32B, the ToF sensor 32C, or the structured-light sensor 322)
  Generation of a three-dimensional map with use of an output of the LiDAR 32E
  Estimation of a self-position using a three-dimensional map The environment to be the target of sensing by the sensor device 21 includes a variety of physical states that are states outside the sensor device 21 or outside a device on which the sensor device 21 is mounted and can be expressed as quantitative data by sensing.

Object sensing (sensing of an object) includes, for example, the following.
  Recognition and identification of the target object using an RGB image captured by the RGB camera 32A
  Measurement of characteristics of the target object, such as a shape, a size, a color, and a temperature The object to be the target of sensing by the sensor device 21 includes various stationary objects and moving objects around the sensor device 21 or around the device on which the sensor device 21 is mounted.

Human sensing (sensing of a human) includes, for example, the following.
  Human recognition, human face recognition, and human identification using an RGB image captured by the RGB camera 32A
  Recognition of a specific part of a person, such as a head, an arm, a hand, an eye, or a nose.
  Estimation of the position of a specific part, including bone estimation
  Estimation of physical characteristics of a human such as height and weight
  Estimation of an attribute of a human such as age and sex The human to be the target of sensing by the sensor device 21 includes a human around the sensor device 21 or around the device on which the sensor device 21 is mounted.

The controller 31 has a plurality of programs of different algorithms as sensing programs for implementing the corresponding sensing functions.

Figure 4:
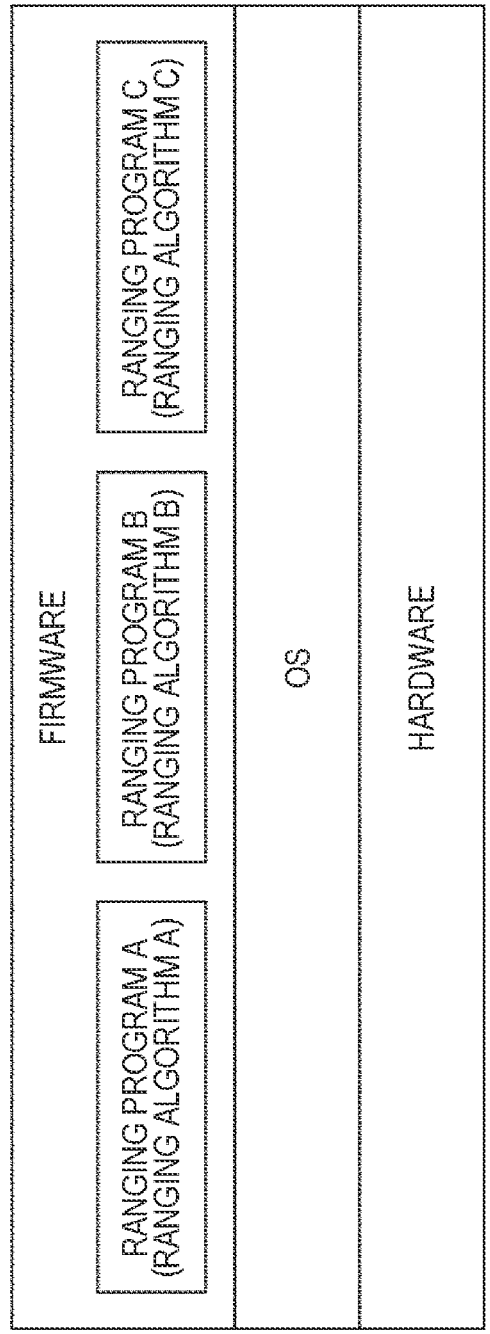
FIG. 4 is a diagram illustrating an example of a sensing program.

FIG. 4 is a diagram illustrating an example of a sensing program prepared in the sensor device 21.

In the example in FIG. 4, a ranging program A, a ranging program B, and a ranging program C are prepared as firmware that runs on an operating system (OS). The ranging program A, the ranging program B, and the ranging program C are sensing programs that implement a ranging function as an environment sensing function.

Each of the ranging program A, the ranging program. B, and the ranging program C is a sensing program that implements the same ranging function by a different sensing algorithm. Each of the ranging program A, the ranging program B, and the ranging program C defines a different sensing algorithm.

The ranging program A is a sensing program that performs ranging by a ranging algorithm A. The ranging program B is a sensing program that performs ranging by a ranging algorithm. B. The ranging program C is a sensing program that performs ranging by a ranging algorithm C.

For example, each of the ranging algorithms A to C is a sensing algorithm that performs ranging with use of a different parameter, for example, by setting a different parameter for the same sensor and calculating the distance by performing the same calculation on the basis of an output of the sensor.

Furthermore, the ranging algorithms A to C are sensing algorithms that perform ranging with use of different calculation methods, for example, by setting the same parameter for the same sensor and calculating the distance by performing different calculations on the basis of an output of the sensor.

In a case where a plurality of distance sensors such as the stereo camera 32B, the ToF sensor 32C, and the structured-light sensor 32D is prepared, each of the ranging algorithms A to C may be a sensing algorithm that performs ranging with use of a different distance sensor.

In this case, for example, the ranging algorithm A performs ranging on the basis of an output of the stereo camera 32B, and the ranging algorithm. B performs ranging on the basis of an output of the ToF sensor 32C. Furthermore, the ranging algorithm C performs ranging on the basis of an output of the structured-light sensor 32D.

As described above, in the sensor device 21, a plurality of programs of different sensing algorithms is prepared as sensing programs for implementing the same ranging function. Sensors used for ranging are associated with at least either the corresponding sensing algorithms or the sensing programs that define the corresponding sensing algorithms. In a case where a sensing program has been executed, the operation of the associated sensor is controlled in conjunction with the execution of the sensing program.

For example, the sensor device 21 mounted on the conveyance robot 2-5 selects a sensing algorithm in accordance with a sensing condition to perform ranging. The sensing condition is a condition for selecting a sensing algorithm determined in accordance with the situation of the conveyance robot 2-5.

For example, in a case where the situation has changed to a situation suitable for the ranging algorithm A, the ranging program A is executed, and ranging is performed with use of the ranging algorithm A. Furthermore, in a case where the situation has changed to a situation suitable for the ranging algorithm B, the ranging program B is executed, and ranging is performed with use of the ranging algorithm B. In a case where the situation has changed to a situation suitable for the ranging algorithm C, the ranging program C is executed, and ranging is performed with use of the ranging algorithm C.

Since a sensing algorithm (sensing program) in accordance with a sensing condition is adaptively selected for ranging, ranging with an optimal sensing algorithm becomes possible. The same applies to a case where the sensing target is other than a distance.

One sensing program defines one sensing algorithm. Selecting a sensing program corresponds to selecting a sensing algorithm.

Note that adaptively selecting a sensing algorithm means selecting a sensing algorithm associated with a sensing condition when it has been detected that that condition has become satisfied. A sensing condition in accordance with each assumed situation is associated with a sensing algorithm considered to be suitable. The association between the sensing condition and the sensing algorithm may be dynamically changed.

Figure 5:
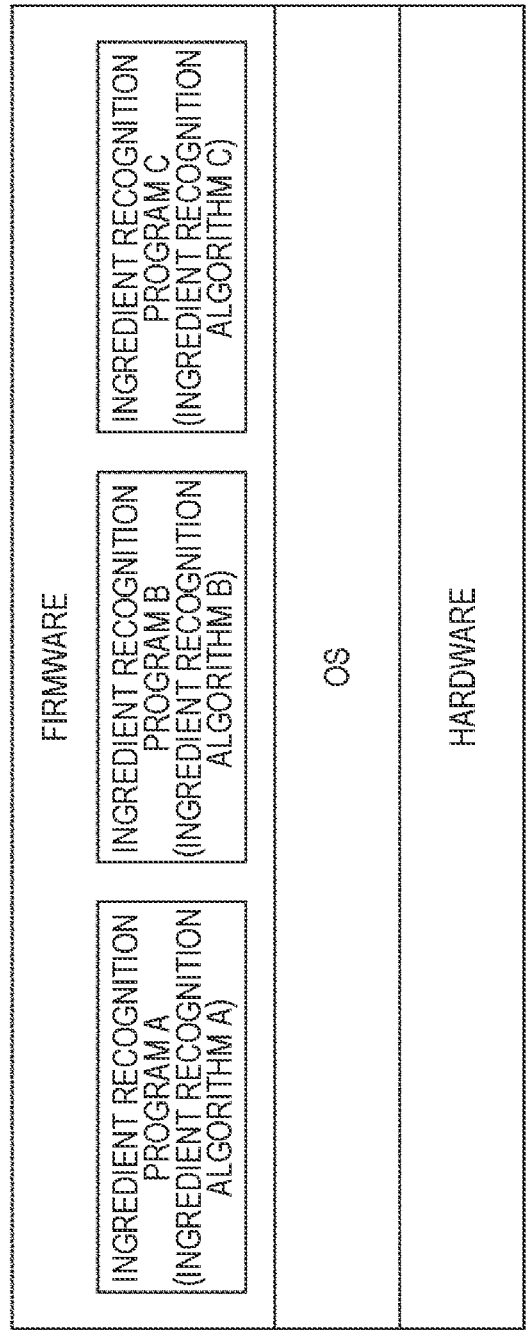
FIG. 5 is a diagram illustrating another example of the sensing program.

FIG. 5 is a diagram illustrating another example of the sensing program.

In the example in FIG. 5, an ingredient recognition program A, an ingredient recognition program B, and an ingredient recognition program C are prepared as firmware that runs on the OS. The ingredient recognition programs A to C are sensing programs that implement an ingredient recognition function as an object sensing function.

The ingredient recognition program A is a sensing program that performs ingredient recognition by an ingredient recognition algorithm. A. The ingredient recognition program B is a sensing program that performs ingredient recognition by an ingredient recognition algorithm B. The ingredient recognition program. C is a sensing program that performs ingredient recognition by an ingredient recognition algorithm C. For example, the sensor device 21 mounted on the cooking robot 2-4 performs recognition of an ingredient by selecting a sensing algorithm in accordance with a sensing condition determined by a cooking process or the like.

Figure 6:
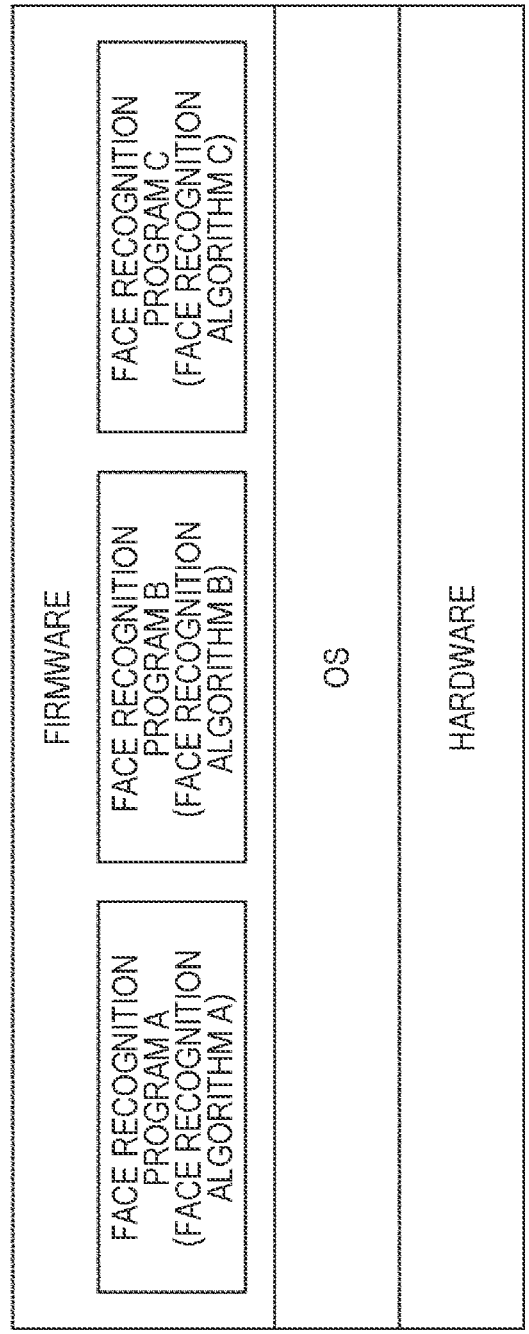
FIG. 6 is a diagram illustrating still another example of the sensing program.

FIG. 6 is a diagram illustrating still another example of the sensing program.

In the example in FIG. 6, a face recognition program A, a face recognition program B, and a face recognition program. C are prepared as firmware that runs on the OS. The face recognition programs A to C are sensing programs that implement a face recognition function as a human sensing function.

The face recognition program A is a sensing program that performs face recognition by a face recognition algorithm A. The face recognition program B is a sensing program that performs face recognition by a face recognition algorithm B. The face recognition program C is a sensing program that performs face recognition by a face recognition algorithm C. For example, the sensor device 21 mounted on the cooking robot 2-4 performs face recognition by selecting a sensing algorithm in accordance with a sensing condition determined by a cooking process or the like.

Update of Sensing Program

The program provision system in FIG. 1 allows for update of the sensing program prepared as firmware in the sensor device 21 of each device.

Figure 7:
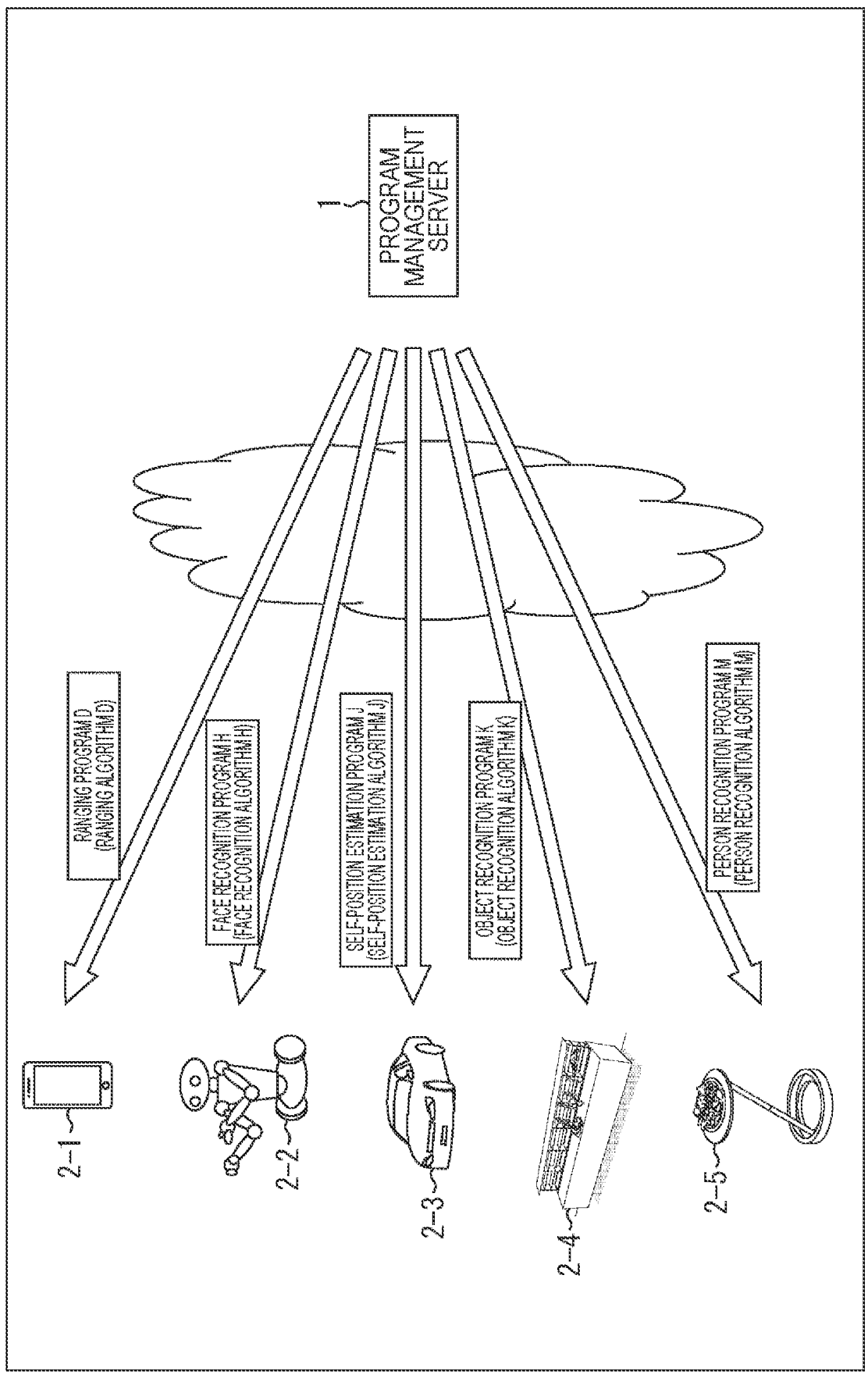
FIG. 7 is a diagram illustrating an example of update of the sensing program.

FIG. 7 is a diagram illustrating an example of update of the sensing program.

As indicated by arrows in FIG. 7, the program management server 1 provides each device with a sensing program. The program management server 1 has a database (DB) of sensing programs to be provided to the corresponding devices.

In the example in FIG. 7, a ranging program D for performing ranging by a ranging algorithm. D is provided to the mobile terminal 2-1, and a face recognition program H for performing face recognition by a face recognition algorithm H is provided to the arm robot 2-2.

Furthermore, a self-position estimation program. J for performing self-position estimation by a self position estimation algorithm J is provided to the mobile object 2-3, and an object recognition program K for performing object recognition by an object recognition algorithm K is provided to the cooking robot 2-4. A person recognition program M for performing person recognition by a person recognition algorithm M is provided to the conveyance robot. 2-5.

Figure 8:
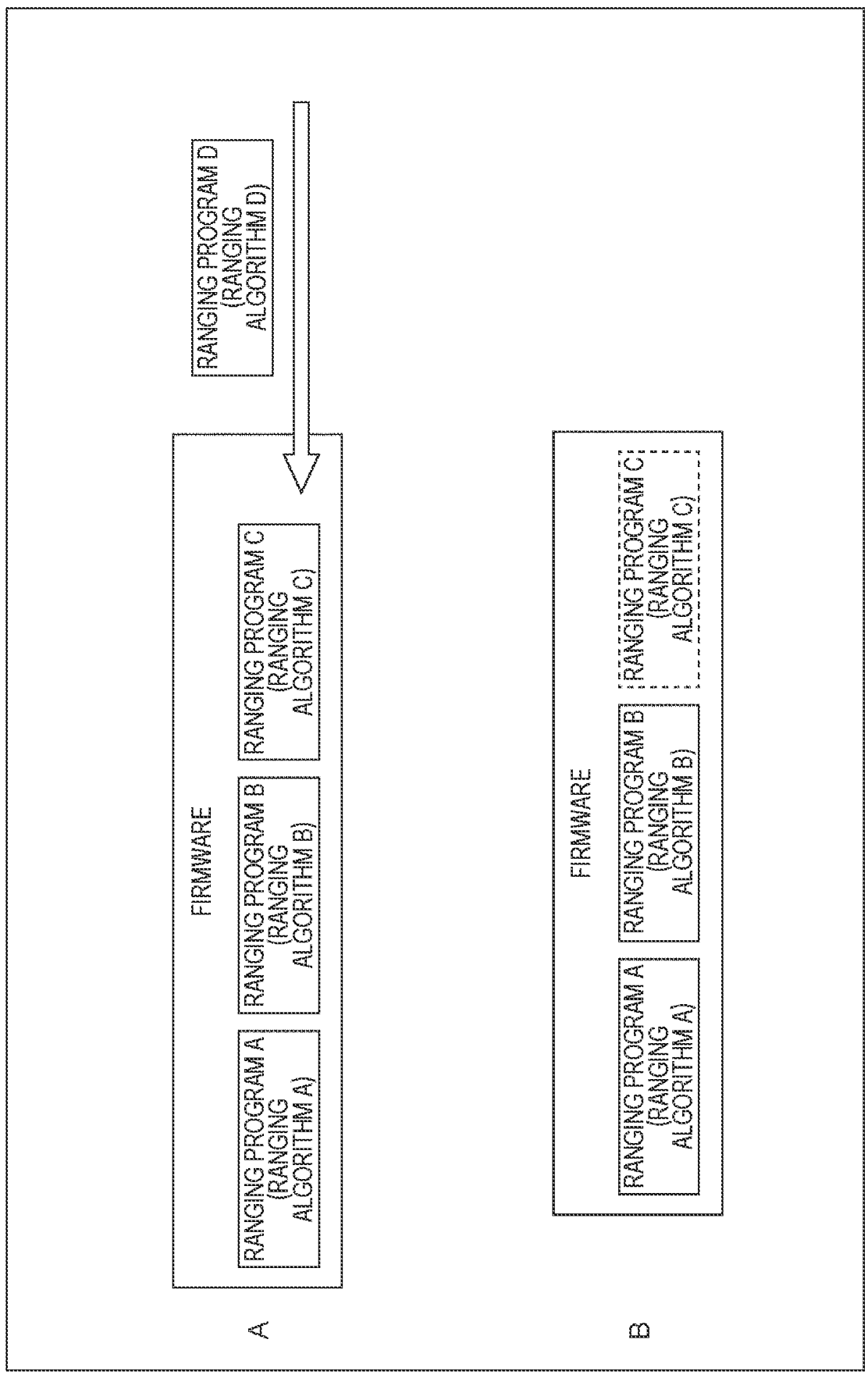
FIG. 8 is a diagram illustrating an example of update of the sensing program.

FIG. 8 is a diagram illustrating an example of update of the sensing program.

The sensor device 21 of each device allows a sensing program to be added as illustrated in A of FIG. 8. In the example in A of FIG. 8, the ranging program D for performing ranging by the ranging algorithm D has been added to the ranging programs A to C for performing ranging by the ranging algorithms A to C.

A sensing program that defines a sensing algorithm in accordance with a general situation has been prepared by default in the sensor device 21 of each device. Even in a case of a situation a sensing program prepared in advance cannot cope with, the sensor device 21 of each device can cope with such a special situation by adding a sensing program that defines a sensing algorithm in accordance with the special situation.

Furthermore, as illustrated in B of FIG. 8, it is also possible to delete (uninstall) a program that is no longer necessary. In the example in B of FIG. 8, the ranging program C is deleted from the ranging programs A to C as indicated by a dashed frame.

Figure 9:
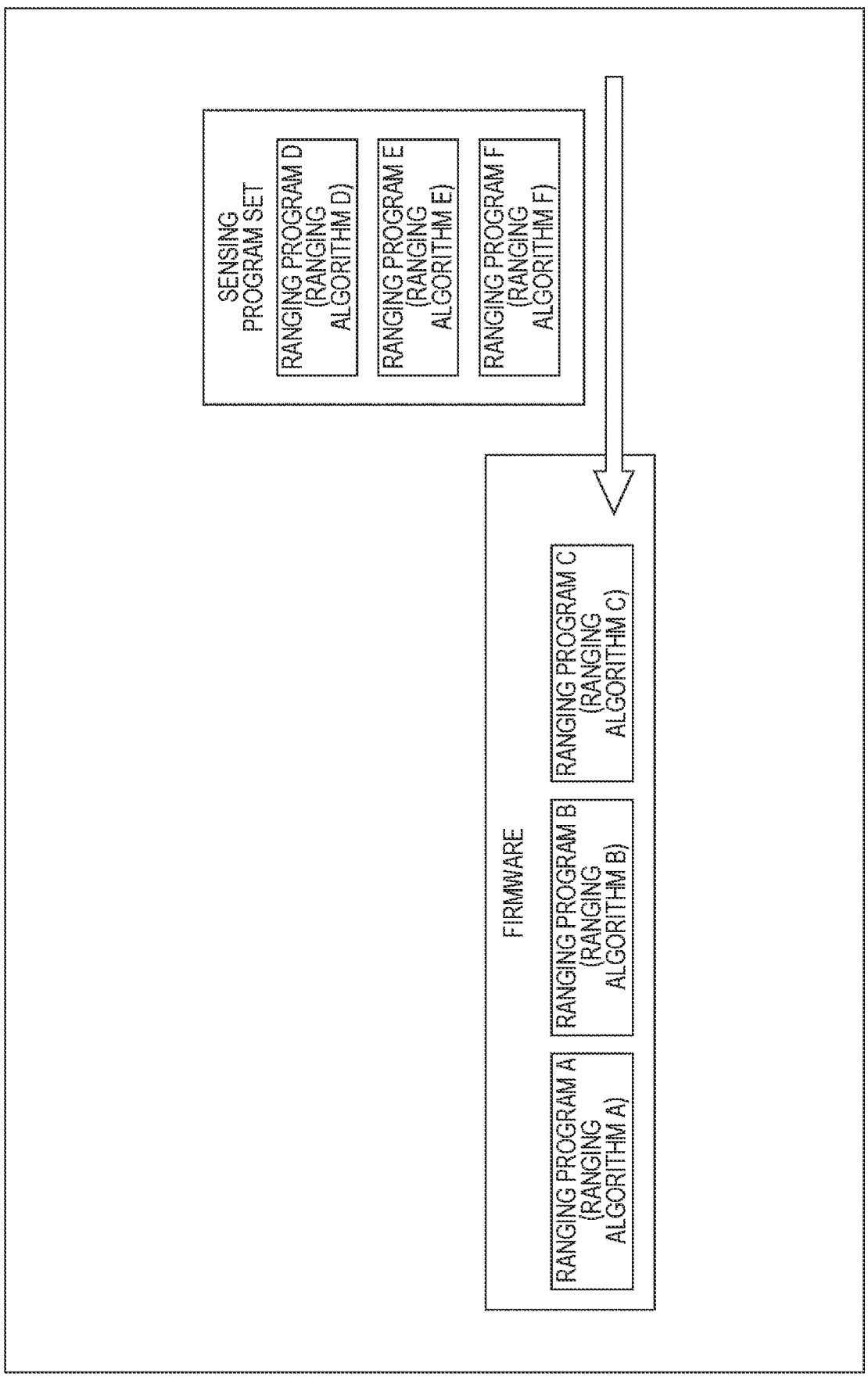
FIG. 9 is a diagram illustrating another example of update of the sensing program.

FIG. 9 is a diagram illustrating another example of update of the sensing program.

As illustrated in FIG. 9, the update can be performed in units of sensing program sets, each constituted by a plurality of sensing programs. In the example in FIG. 9, the program management server 1 provides and adds a sensing program set constituted by the ranging program. D that performs ranging by the ranging algorithm D, a ranging program F that performs ranging by a ranging algorithm F, and a ranging program F that performs ranging by a ranging algorithm F.

Figure 10:
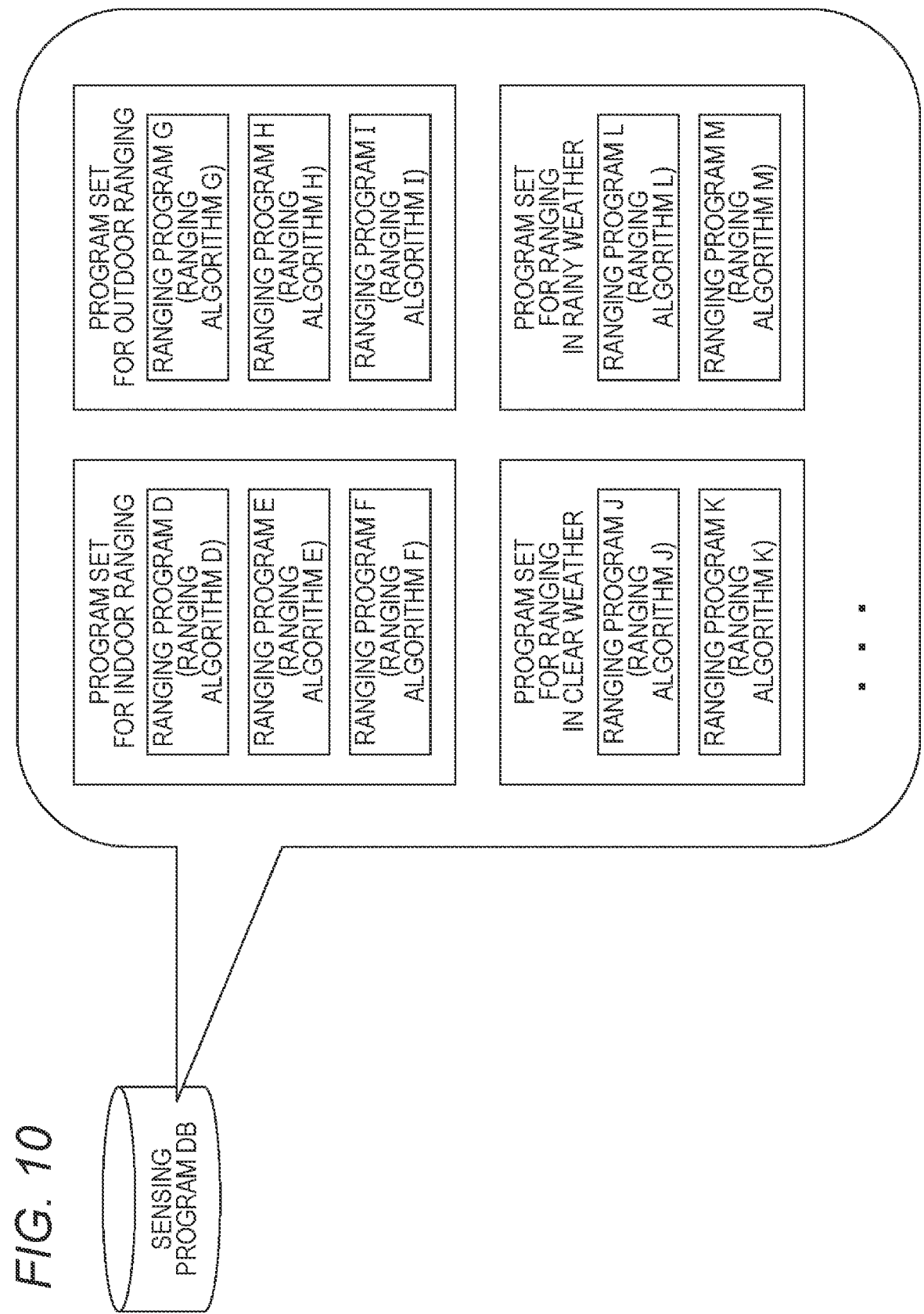
FIG. 10 is a diagram illustrating an example of a sensing program set.

As illustrated in FIG. 10, a plurality of sensing program sets is prepared in the DB of the program management server 1, each sensing program set including a plurality of sensing programs grouped by use condition such as place, situation, or purpose.

In the example in FIG. 10, a sensing program set for indoor ranging and a sensing program set for outdoor ranging are prepared. These sensing program sets are in accordance with the place.

The sensing program sets in accordance with the place are, for example, sets used in the sensor device 21 mounted on a device having a movement function. Sensing program sets further broken down by the place may be prepared, for example, a sensing program set for kitchens and a sensing program set for dining rooms, both are for indoors.

It is also possible to prepare sensing program sets, each for one of a variety of places, such as a sensing program set for seas, a sensing program set for mountains, and a sensing program set for inside trains.

Furthermore, in the example in FIG. 10, a sensing program set for ranging in clear weather and a sensing program set for ranging in rainy weather are prepared. These sensing program sets are in accordance with the weather.

The sensing program sets in accordance with the weather are, for example, used in the sensor device 21 mounted on a device that has a movement function and may move outdoors. It is also possible to prepare sensing program sets for a variety of changing situations, such as a sensing program set for each time zone such as morning, daytime, or night, a sensing program set for each brightness, and a sensing program set for each temperature.

It is also possible to prepare sensing program sets for a variety of purposes, such as a sensing program set for running, a sensing program set for baseball, a sensing program set for cooking curry, and a sensing program set for making a salad.

The sensor device 21 of each device can collectively add sensing programs by designating an ID of a sensing program set in accordance with the use condition. An ID as identification data is set for each sensing program set. An ID as identification data is also set for each sensing program constituting the sensing program set.

Figure 11:
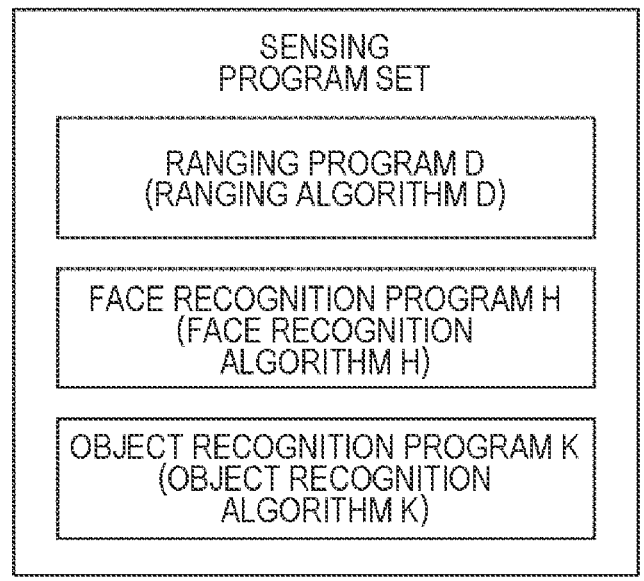
FIG. 11 is a diagram illustrating an example of the sensing program set.

Instead of a set of sensing programs for implementing the same ranging function by different sensing algorithms, a set of sensing programs for implementing different functions may be added as illustrated in FIG. 11.

In the example in FIG. 11, a sensing program set is constituted by the ranging program D, the face recognition program. H, and the object recognition program. K. The ranging program D is a sensing program that performs ranging by the ranging algorithm D, and the face recognition program H is a sensing program that performs face recognition by the face recognition algorithm H. The object recognition program K is a sensing program that performs object recognition by the object recognition algorithm K.

Figure 12:
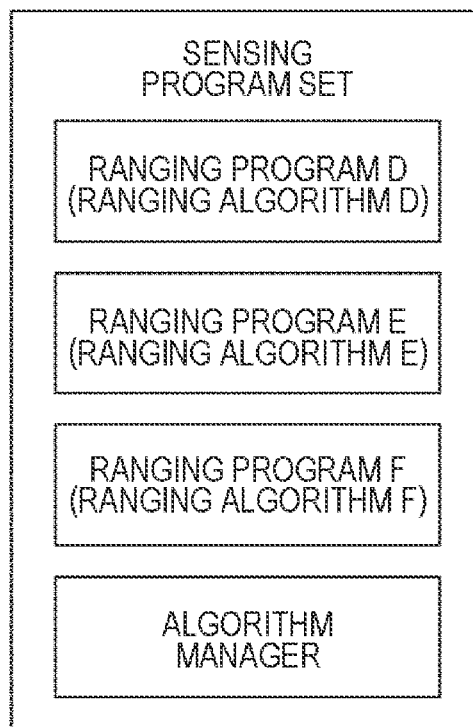
FIG. 12 is a diagram illustrating an example of the sensing program set.

FIG. 12 is a diagram illustrating an example of the sensing program set.

The sensing program set illustrated in FIG. 12 includes an algorithm manager, which is a program for controlling adaptive selection of an algorithm.

The sensor device 21 executes the algorithm manager to select a sensing algorithm in accordance with the sensing condition. The algorithm manager includes a setting of a combination of information showing the type of the sensing program for controlling execution and information showing the order in which the sensing programs are executed. As described above, an algorithm manager may be prepared for each sensing program set.

Figure 13:
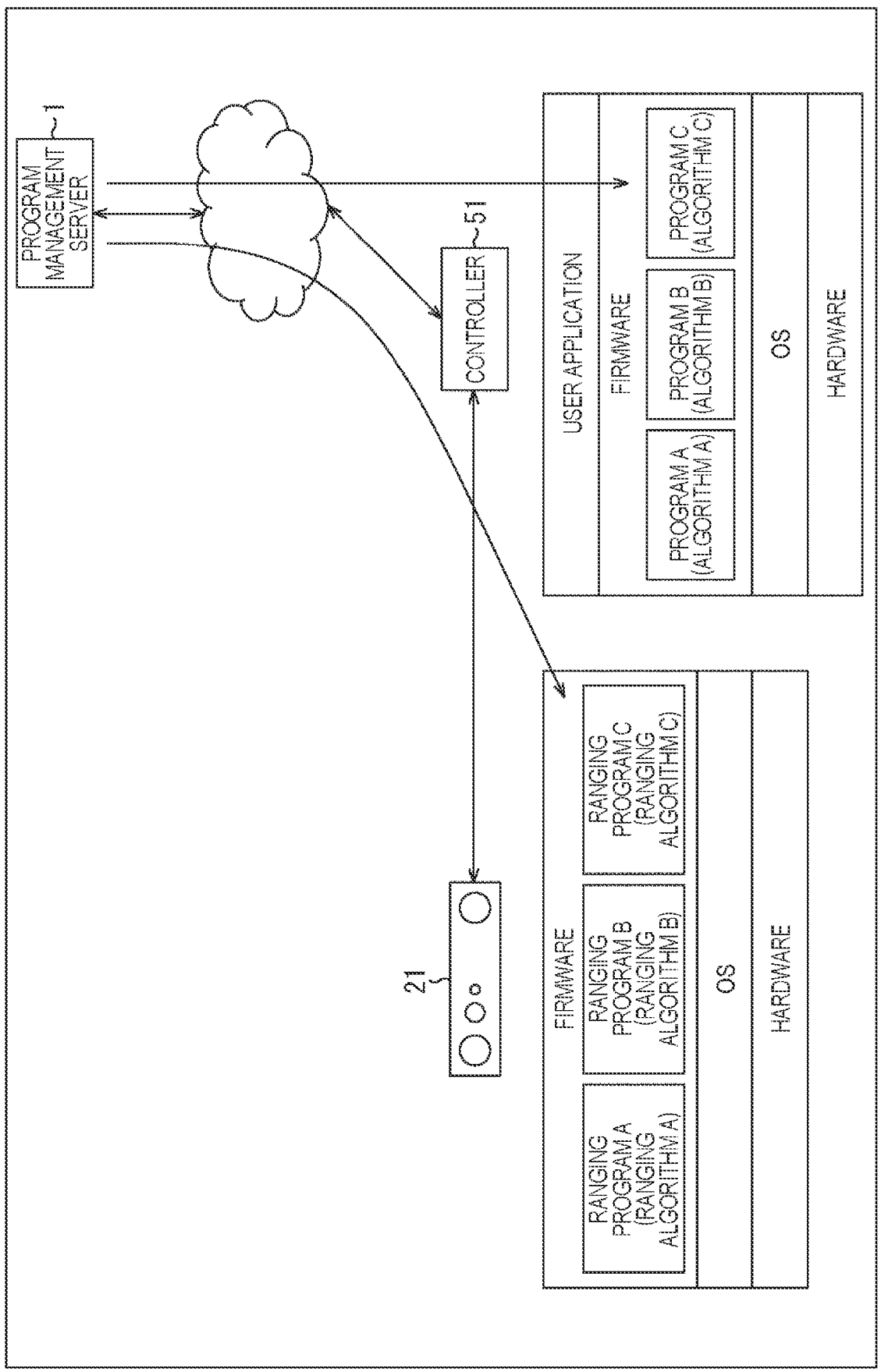
FIG. 13 is a diagram illustrating an example of update of the sensing program.

FIG. 13 is a diagram illustrating an example of update of the sensing program.

A sensing program may be executed in each of the sensor device 21 and a controller 51, which is a host side device, for implementation of a predetermined function such as a ranging function. In this case, the sensing program of the controller 51 can be updated similarly to the sensing program of the sensor device 21. The controller 51 is, for example, a host side data processing device such as the CPU of the mobile terminal 2-1 or a CPU of a PC mounted on the arm robot 2-2.

A sensing program for updating firmware of the sensor device 21 and a sensing program for updating firmware of the controller 51 may be included in one sensing program set and provided.

The sensing program and the sensing program set may be provided for a fee or for free. One sensing program set may include both a paid sensing program and a free sensing program.

At the time of update of the sensing program performed as described above, the program management server 1 may perform authentication of the sensor device 21 on the basis of key information for authentication, and update may be performed if the device has been confirmed to be valid. The key information for authentication is prepared as unique information for each sensor device 21.

The authentication of the sensor device 21 using the key information for authentication may be performed not at the time of update of the sensing program but at the time of execution of the sensing program.

Provider of Sensing Program

Figure 14:
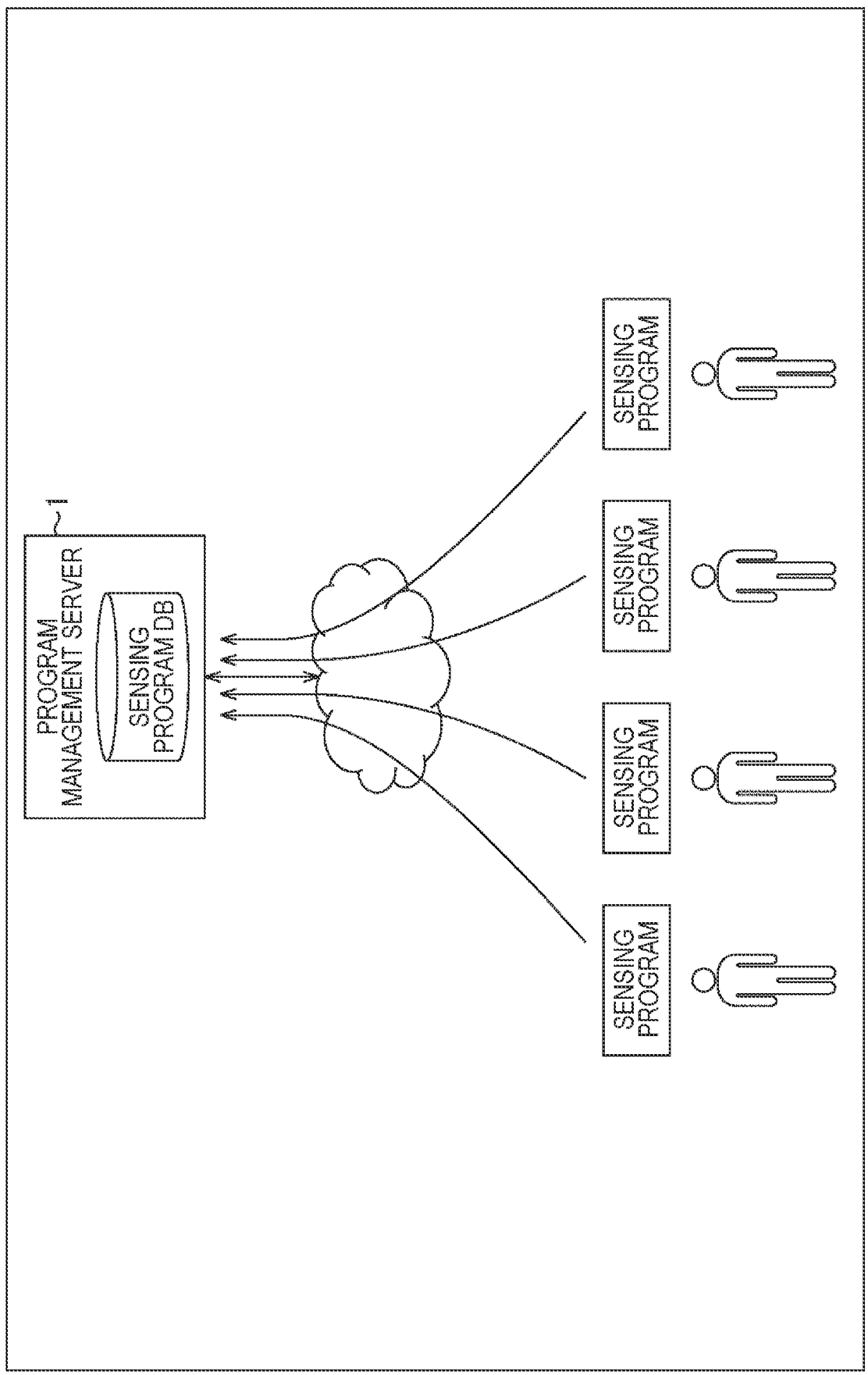
FIG. 14 is a diagram illustrating an example of a provider of the sensing program.

FIG. 14 is a diagram illustrating an example of a provider of the sensing program.

As illustrated in FIG. 14, sensing programs provided from the program management server 1 to each device are developed by, for example, developers who have performed user registration for a service in the program provision system. Each developer is provided with information regarding specifications of the sensor device 21 and a development tool such as a software development kit (SDK) by a service provider who operates a service using the program provision system.

Each developer develops a sensing program or a sensing program set by using the SDK or the like, and uploads the sensing program or the sensing program set from his or her computer to the program management server 1. The uploaded sensing programs and sensing program sets are stored and managed in the sensing program. DB.

The program management server 1 manages the usage situation of each of the sensing programs and the sensing program sets, such as the number of installations and the number of executions in each device. A predetermined incentive such as payment of an amount of money or issuance of points in accordance with the usage situation may be provided from the service provider to the developer.

Figure 15:
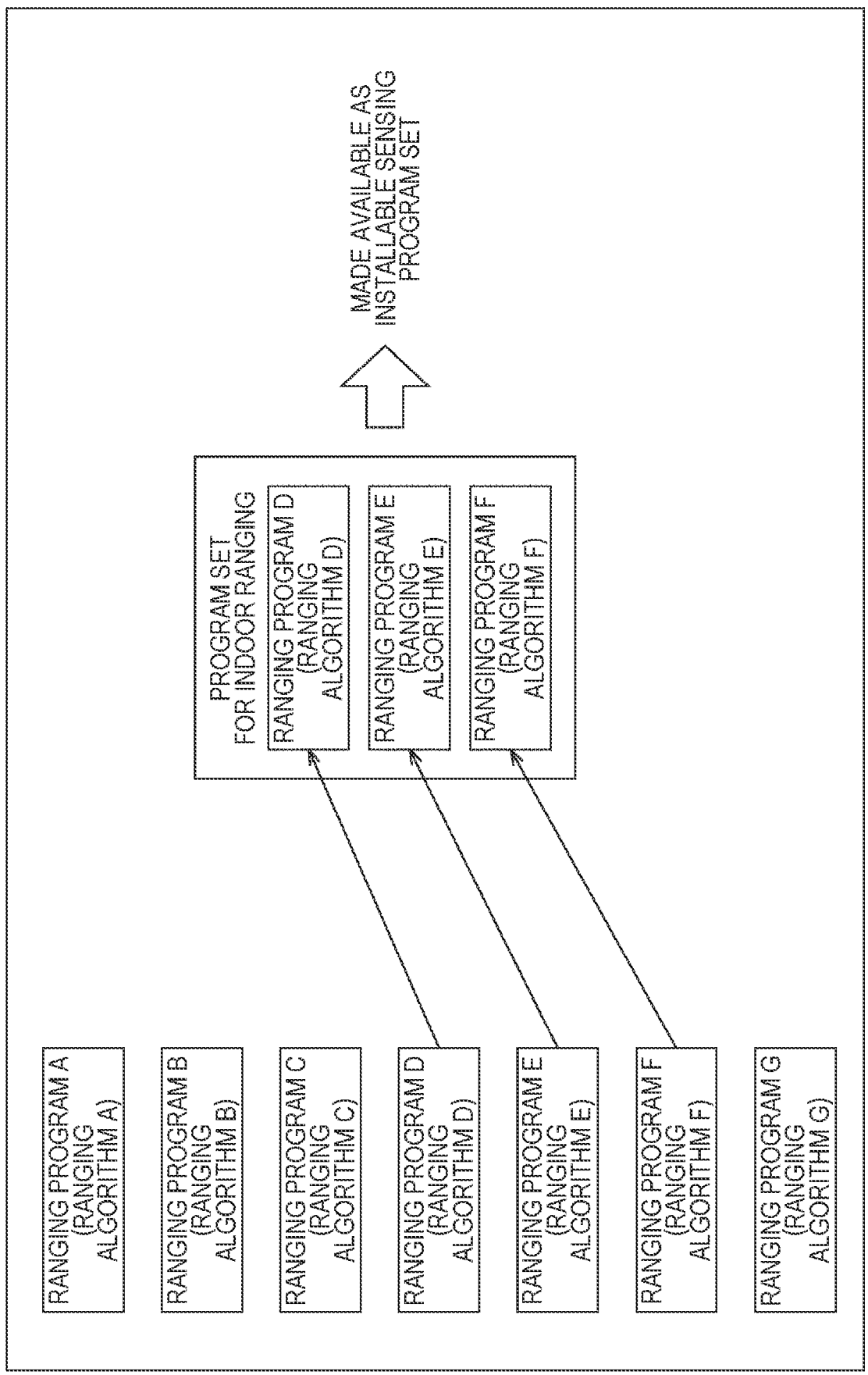
FIG. 15 is a diagram illustrating an example of generation of the sensing program set.

FIG. 15 is a diagram illustrating an example of generation of a sensing program set.

The sensing program set may be generated by any user Grouping together sensing programs developed and uploaded by each developer.

In the example in FIG. 15, a program set for indoor ranging is generated by grouping three sensing programs, the ranging program D, the ranging program F, and the ranging program F from the ranging programs A to G.

The program set for indoor ranging generated in this manner is made available on the program management server 1 as an installable sensing program set, and is installed on a predetermined. device.

An incentive may be provided to the user who has generated. the sensing program set by grouping the plurality of sensing programs.

<Use Case of Sensing Program>

Here, a use case of object sensing will be described.

For example, in a case where the cooking robot 2-4 performs cooking, the sensor device 21 mounted on the cooking robot 2-4 performs object sensing by executing a sensing program. Ingredients, cooking tools, tableware, and the like that are used for cooking to complete a certain dish are set as target objects, and recognition of the target objects, measurement of distances to the target objects, and the like are performed as object sensing.

Furthermore, recognition of the states of the target objects, such as the state of dirt on the tableware as the target object and dryness of the cooking tools that have been cleaned, is performed as object sensing.

Note that a dish means a deliverable obtained by cooking. Cooking means a process of making a dish or an act (work) of making the dish.

Configuration of Control System.

Figure 16:
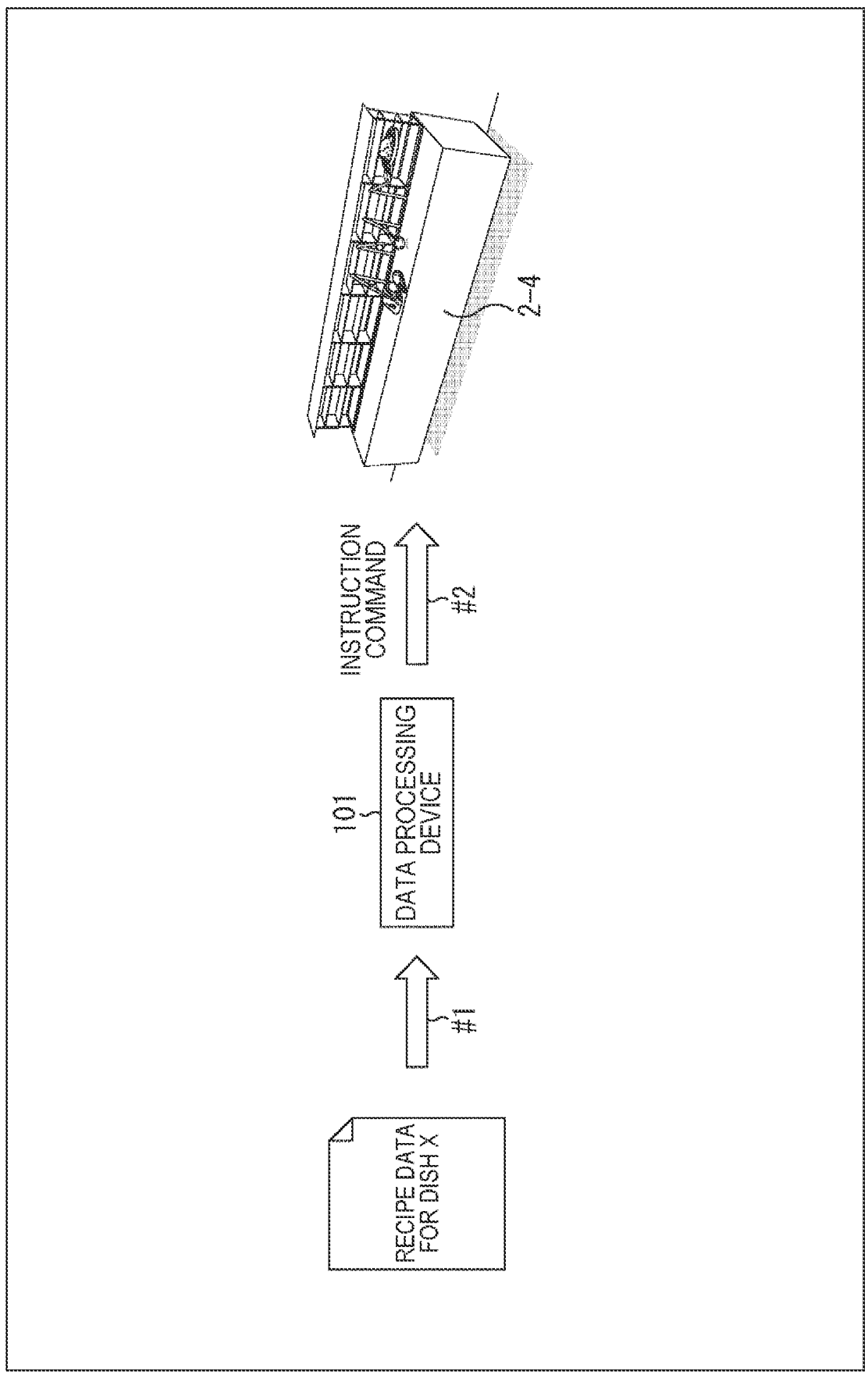
FIG. 16 is a diagram illustrating a configuration example of a control system including a cooking robot.

FIG. 16 is a diagram illustrating a configuration example of a control system including the cooking robot 2-4.

As illustrated is FIG. 16, the control system is constituted by a data processing device 101 and the cooking robot 2-4. The cooking robot 2-4 has a drive system device such as the cooking arms and various sensors, and has a function of performing sensor cooking. For example, a plurality of sensor devices 21 is mounted on the cooking robot 2-4. The cooking robot 2-4 is installed in a home, for example.

The data processing device 101 controls the cooking robot 2-4. The data processing device 101 is constituted by a computer or the like.

As illustrated at the left end in FIG. 16, the data processing device 101 controls the cooking robot 2-4 on the basis of recipe data prepared for each dish. The recipe data describes information regarding each cooking process.

The data process rig device 101 controls the cooking robot 2-4 on the basis of the recipe data to make a dish. For example, in a case where recipe data for a certain dish X has been input as indicated by an arrow #1, the data processing device 101 controls a cooking operation of the cooking robot 2-4 by outputting an instruction command on the basis of a description in the recipe data X as indicated by an arrow #2.

The cooking robot 2-4 drives each portion such as the cooking arms in accordance with the instruction command supplied from the data processing device 101, and performs the cooking operation of each cooking process. The instruction command includes information for controlling torque, driving directions, and driving amounts of motors disposed in the cooking arms.

Until the dish is completed, instruction commands are sequentially output from the data processing device 101 to the cooking robot 2-4. The cooking robot 2-4 performs operations in accordance with the instruction commands, so that the dish is finally completed.

Figure 17:
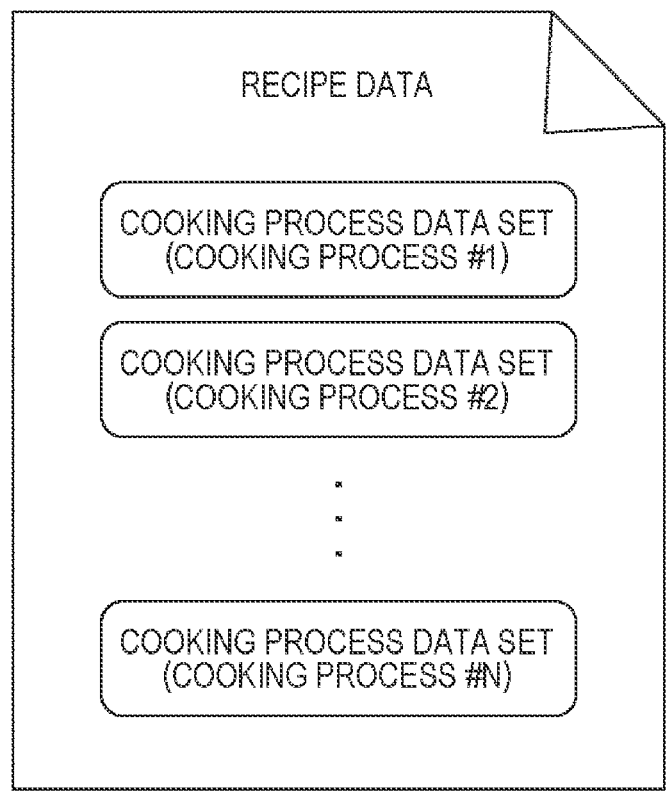
FIG. 17 is a diagram illustrating an example of contents of a description in recipe data.

FIG. 17 is a diagram illustrating an example of contents of a description in recipe data.

As illustrated in FIG. 17, one recipe data is constituted by a plurality of cooking process data sets. In the example in FIG. 17, a cooking process data set related to a cooking process #1, a cooking process data set related to a cooking process #2, . . . , and a cooking process data set related to a cooking process #N are included.

Each cooking process data set includes cooking operation information, which is information regarding a cooking operation for implementing the cooking process. For example, one cooking process data set is constituted by time-series data of the cooking operation information for implementing one cooking process.

The cooking operation information includes ingredient information and operation information.

The ingredient information is information regarding the ingredient used in the cooking process. The information regarding the ingredient includes information showing the type of ingredient, the amount of ingredient, the size of ingredient, and the like.

Note that the ingredients include not only ingredients that have not been cooked at all but also cooked (pre-treated) ingredients obtained by performing certain cooking. The ingredient information included in the cooking operation information of a certain cooking process includes information regarding the ingredients that have undergone the cooking processes before the cooking process.

The operation information is information regarding motions of the cooking arms and the like in the cooking process. The information regarding the motions includes information showing the type of cooking tool used for cooking.

For example, the operation information of a cooking process of cutting a certain ingredient includes information showing that a kitchen knife is used as a cooking tool, a position to be cut, the number of times of cutting, and information showing the way of cutting such as strength, angle, and speed.

Furthermore, the operation information of a cooking process of stirring a pot of a liquid as an ingredient includes information showing that a ladle is used as a cooking tool, and information showing the way of stirring such as strength, angle, speed, and time.

The operation information of a cooking process for arrangement includes information regarding the way of arrangement showing tableware to be used for the arrangement, how to dispose the ingredients, the colors of the ingredients, and the like.

Figure 18:
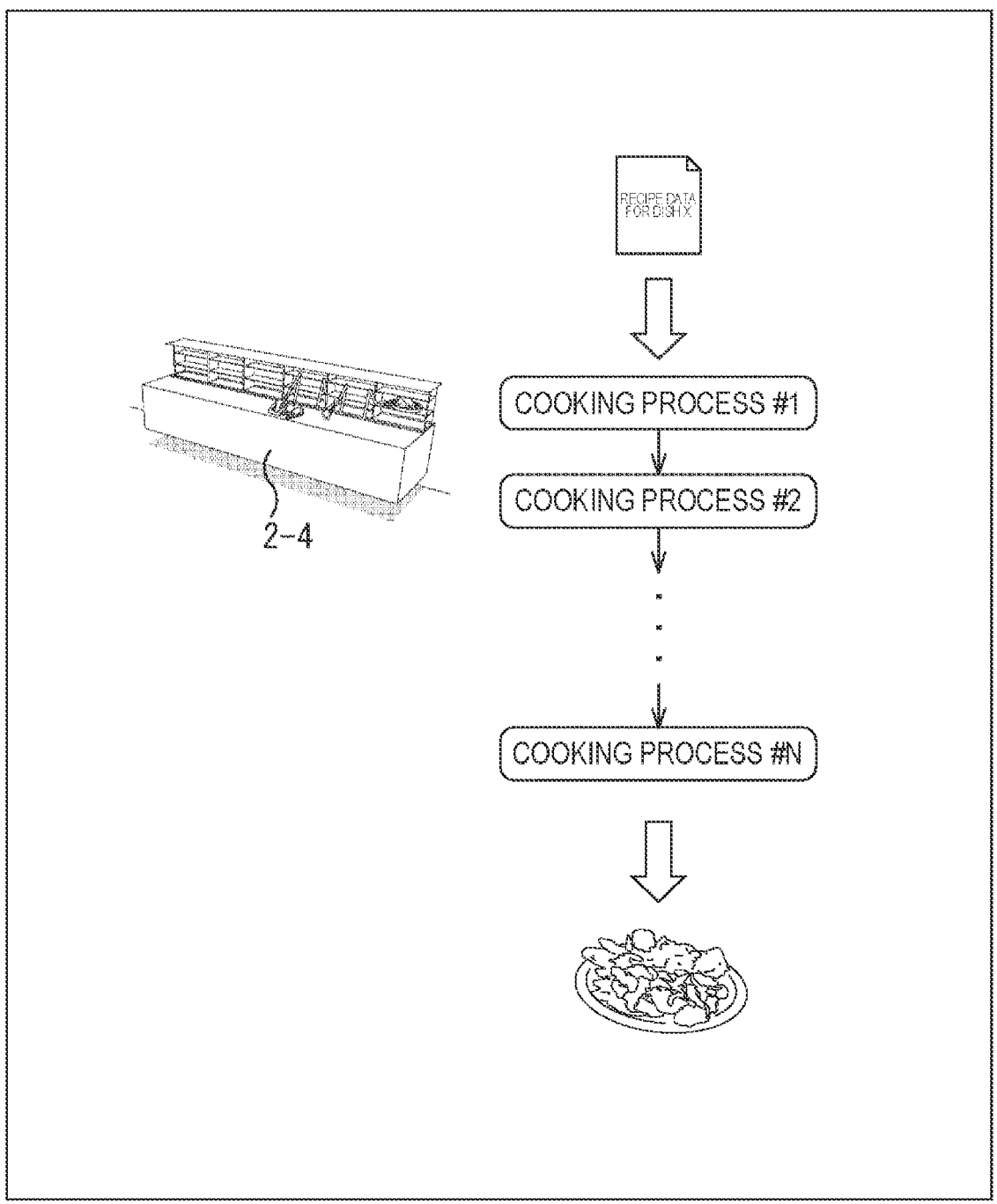
FIG. 18 is a diagram illustrating an example of a flow of reproduction of a dish based on the recipe data.

FIG. 18 is a diagram illustrating an example of a flow of reproduction of a dish based on recipe data.

As illustrated in FIG. 18, the cooking robot 2-4 reproduces the dish by repeating, for each cooking process, cooking on the basis of the cooking operation information at each time included in the cooking process data set described in the recipe data.

For example, cooking at each time is performed by the cooking arms being caused to execute an operation represented by the operation information, in which the ingredient represented by the ingredient information is set as a target. One dish is completed through a plurality of cooking processes, that is, the cooking processes #1 to #N.

Figure 19:
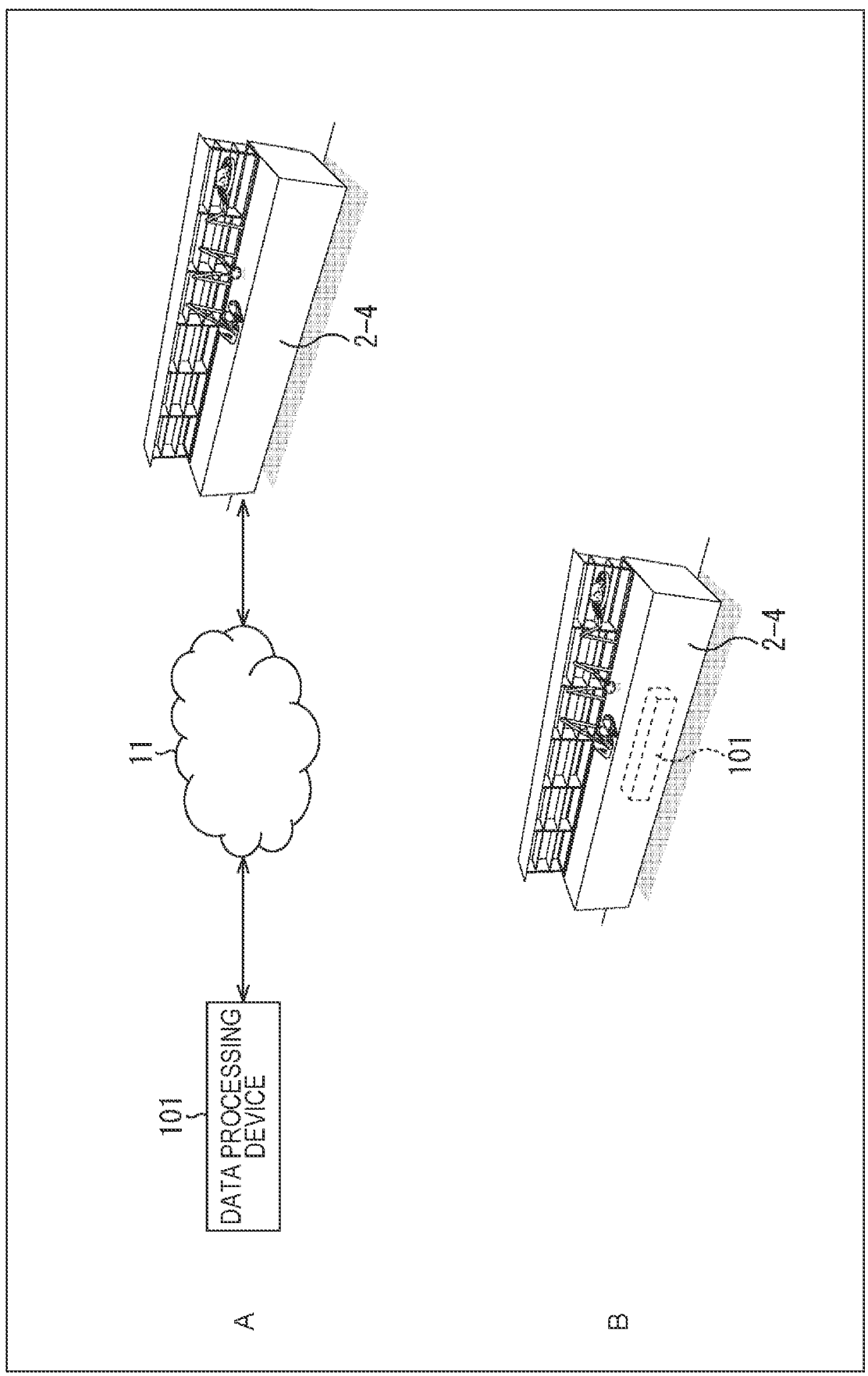
FIG. 19 is a diagram illustrating an example of disposing a data processing device.

FIG. 19 is a diagram illustrating an example of disposing the data processing device 101.

As illustrated in A. of FIG. 19, the data processing device 101 is disposed as, for example, a device outside the cooking robot 2-4. In the example in A of FIG. 19, the data processing device 101 and the cooking robot 2-4 are connected via the network 11 such as the Internet.

An instruction command transmitted from the data processing device 101 is received by the cooking robot 2-4 via the network 11. Various types of data such as an image captured by a camera of the cooking robot 2-4 and sensor data measured by a sensor disposed in the cooking robot 2-4 including the sensor device 21 are transmitted from the cooking robot 2-4 to the data processing device 101 via the network 11.

As illustrated in B of FIG. 19, the data processing device 101 may be disposed inside a housing of the cooking robot 2-4. In this case, the operation of each portion of the cooking robot 2-4 is controlled in accordance with an instruction command generated by the data processing device 101.

Hereinafter, a description will be mainly given on the assumption that the data processing device 101 is disposed as a device outside the cooking robot 2-4.

Appearance of Cooking Robot

Figure 20:
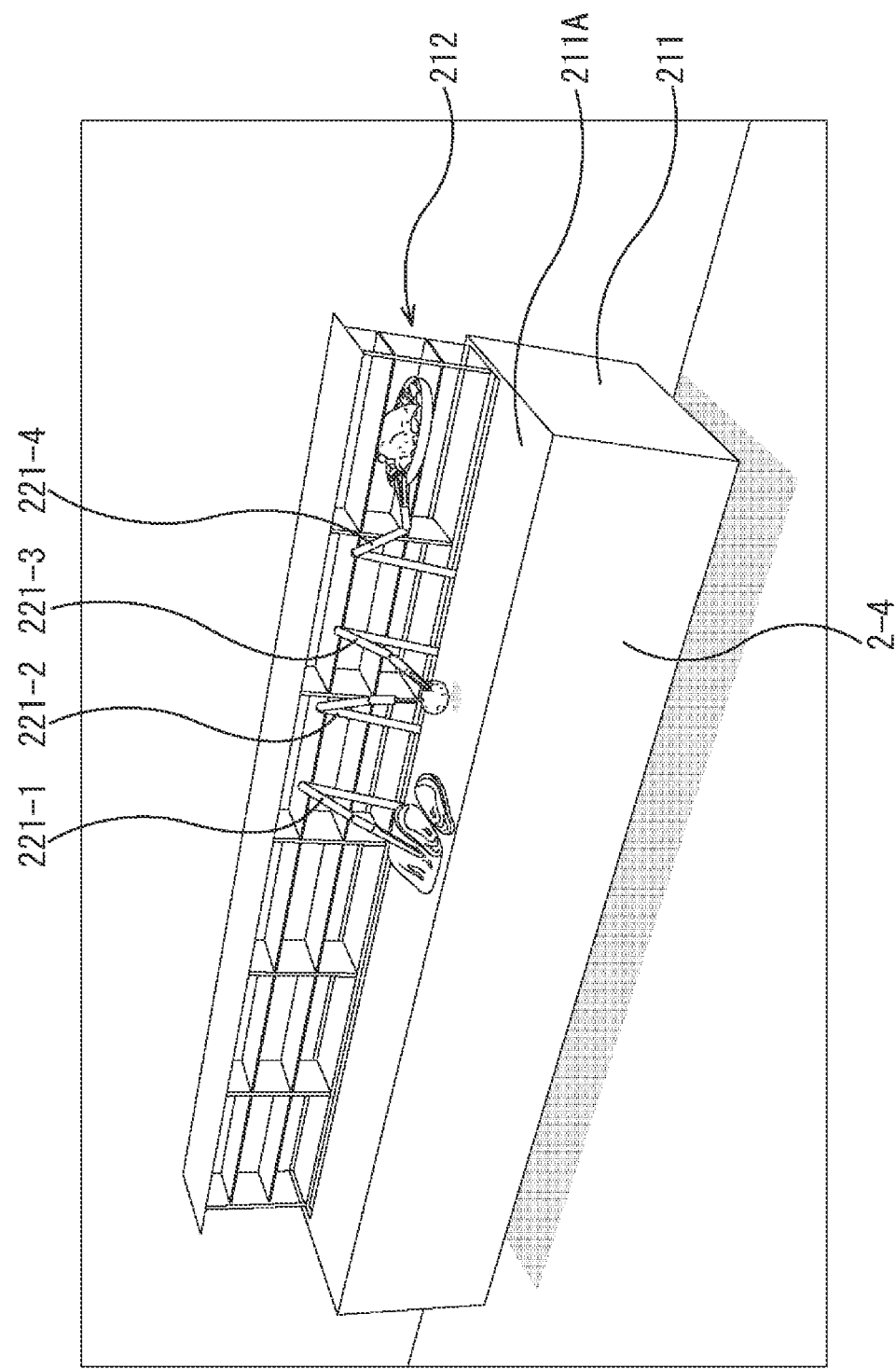
FIG. 20 is a perspective view illustrating an appearance of the cooking robot.

FIG. 20 is a perspective view illustrating an appearance of the cooking robot 2-4.

As illustrated in FIG. 20, the cooking robot 2-4 is a kitchen type robot having a housing 211 having a horizontally long rectangular parallelepiped shape. Various components are disposed inside the housing 211, which is a main body of the cooking robot 2-4.

A cooking assistance system 212 is disposed on the back side of the housing 211. Each space divided by a thin plate-shaped member so as to be formed in the cooking assistance system 212 has a function of assisting cooking by cooking arms 221-1 to 221-4, such as a refrigerator, a convection microwave oven, and a storage.

A rail is disposed on a top plate 2113 in a longitudinal direction, and the cooking arms 221-1 to 221-4 are disposed on the rail. The cooking arms 221-1 to 221-4 can be changed in position along the rail as a movement mechanism.

The cooking arms 221-1 to 221-4 are robot arms having a configuration in which cylindrical members are connected at joints. Various works related to cooking are performed by the cooking arms 221-1 to 221-4.

A space above the top plate 211A is a cooking space in which the cooking arms 221-1 to 221-4 perform cooking.

Although four cooking arms are illustrated in FIG. 20, the number of cooking arms is not limited to four. Hereinafter, in a case where it is not necessary to distinguish each of the cooking arms 221-1 to 221-4, the cooking arms are collectively referred to as cooking arms 221 as appropriate.

Figure 21:
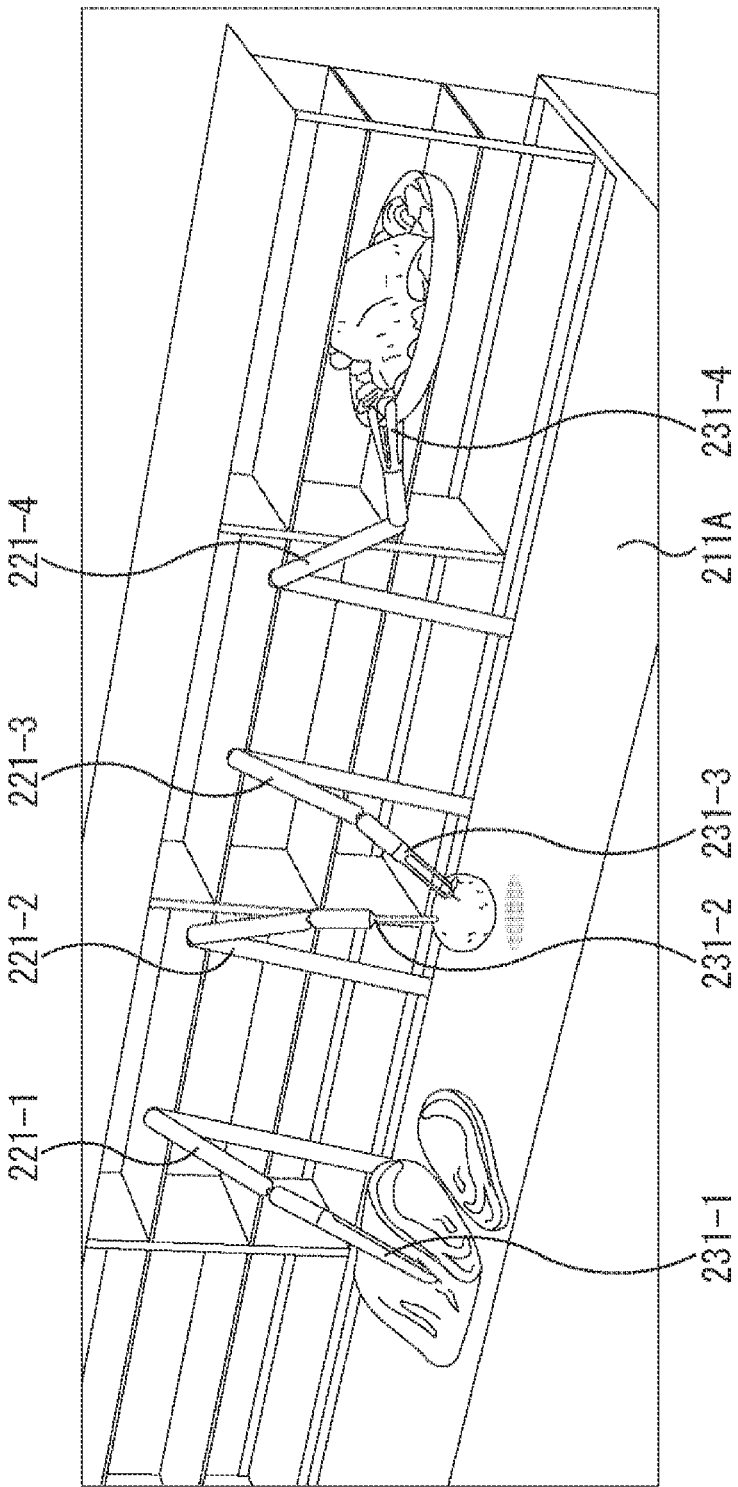
FIG. 21 is an enlarged view illustrating a state of a cooking arm.

FIG. 21 is an enlarged view illustrating a state of the cooking arms 221.

As illustrated in FIG. 21, attachments having various cooking functions are attached to distal ends of the cooking arms 221. Various attachments are prepared as attachments for the cooking arms 221, such as an attachment having a manipulator function (hand function) for gripping an ingredient, tableware, or the like, and an attachment having a knife function for cutting an ingredient.

In the example in FIG. 21, a knife attachment. 231-1, which is an attachment having a knife function, is attached to the cooking arm 221-1. A lump of meat placed on the top plate 211A is cut with use of the knife attachment 231-1.

A spindle attachment 231-2, which is an attachment used to fix an ingredient or rotate an ingredient, is attached to the cooking arm 221-2.

A peeler attachment 231-3, which is an attachment having a peeler function for peeling an ingredient, is attached to the cooking arm 221-3.

A potato raised by the cooking arm 221-2 with use of the spindle attachment 231-2 is peeled by the cooking arm 221-3 with use of the peeler attachment 231-3. As described above, a plurality of the cooking arms 221 can cooperate to perform one work.

A manipulator attachment 231-4, which is an attachment having a manipulator function, is attached to the cooking arm 221-4. The manipulator attachment 231-4 is used to bring a frying pan with chicken on it into a space for the cooking assistance system 212 having an oven function.

Such cooking by the cooking arms 221 proceeds with the attachments being replaced as appropriate in accordance with contents of the work. It is also possible to attach the same type of attachments to a plurality of the cooking arms 221. For example, the manipulator attachment 231-4 may be attached to each of the four cooking arms 221.

Cooking by the cooking robot 2-4 is not only performed with use of attachments as described above prepared as tools for the cooking arms, but also performed with use of, as appropriate, the same tools as those used by humans for cooking. Examples of cooking performed include grasping a knife used by humans with the manipulator attachment 231-4 and then using the knife to cut an ingredient.

Configuration of Cooking Arm

Figure 22:
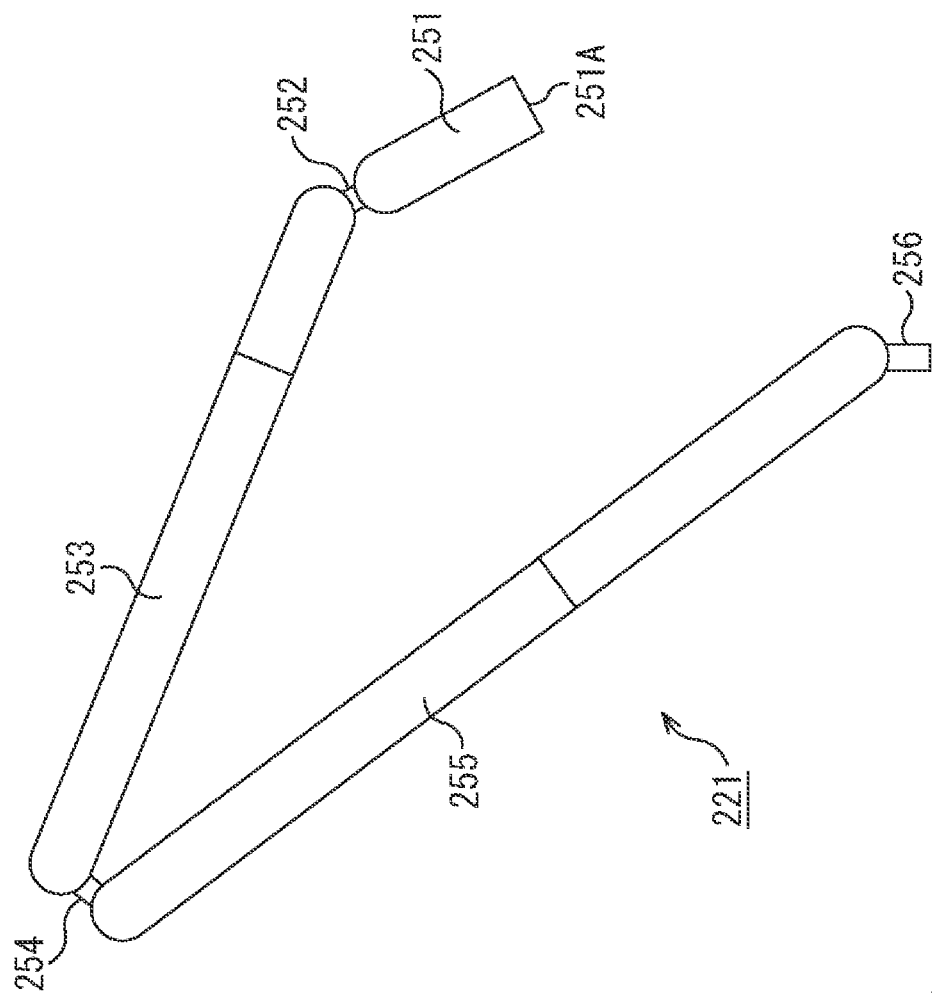
FIG. 22 is a diagram illustrating an appearance of the cooking arm.

FIG. 22 is a diagram illustrating an appearance of the cooking arm 221.

As illustrated in FIG. 22, the cooking arm 221 has an overall configuration in which thin cylindrical members are connected at hinge portions serving as joints. Each hinge portion is disposed with a motor or the like that generates a force for driving each member.

As the cylindrical members, a detachable member 251, a relay member 253, and a base member 255 are disposed in this order from the distal end.

The detachable member 251 and the relay member 253 are connected by a hinge portion 252, and the relay member 253 and the base member 255 are connected by a hinge portion 254.

A detachable portion 251A to/from which an attachment is attached/detached is disposed at a distal end of the detachable member 251. The detachable member 251 operates the attachment to function as a cooking function arm portion that performs cooking.

A detachable portion 256 attached to the rail is disposed at a proximal end of the base member 255. The base member 255 functions as a movement function arm portion that moves the cooking arm 221.

Figure 23:
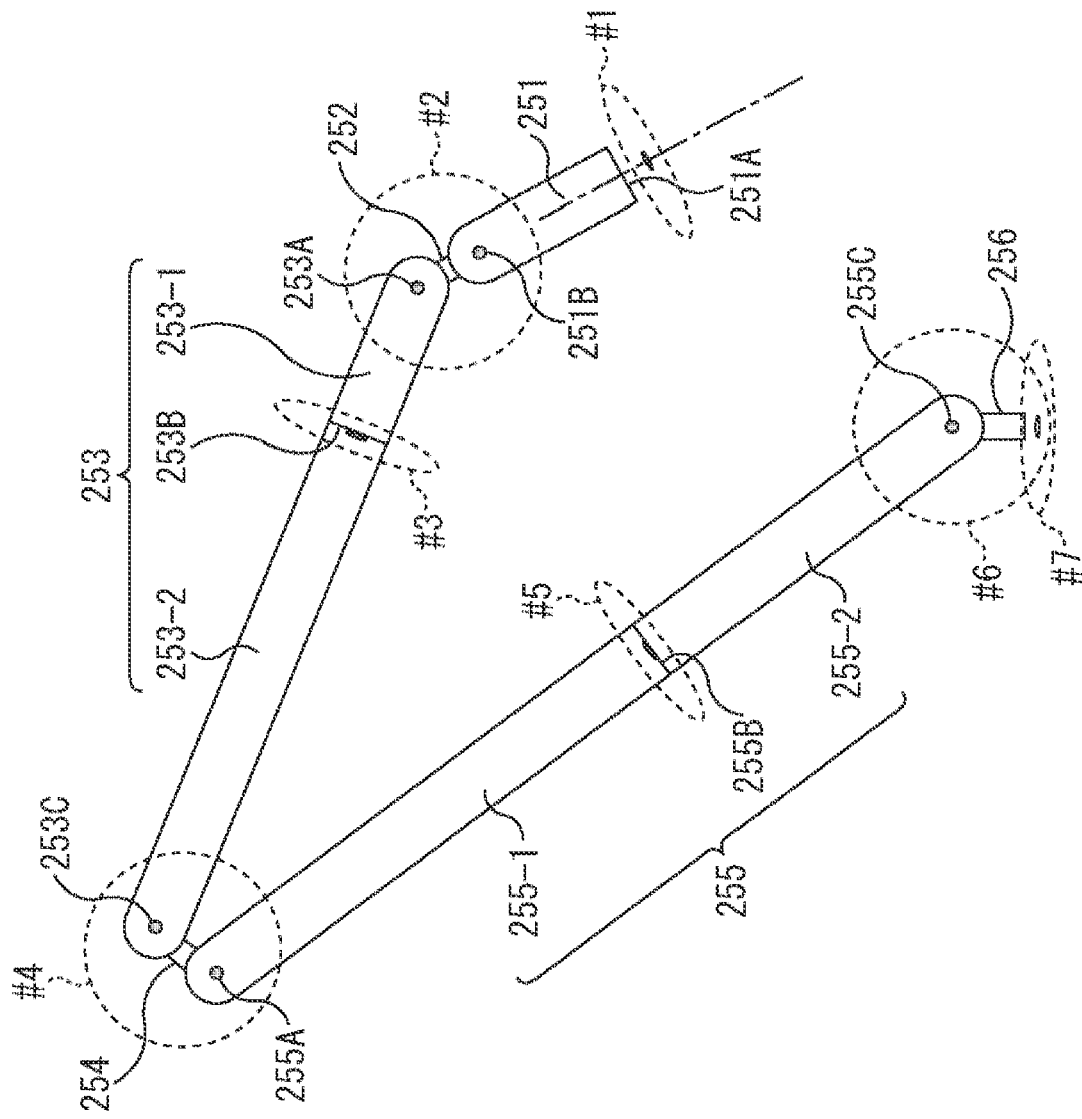
FIG. 23 is a diagram illustrating an example of a range of motion of each portion of the cooking arm.

FIG. 23 is a diagram illustrating an example of a range of motion of each portion of the cooking arm 221.

As indicated by an ellipse #1, the detachable member 251 is rotatable about the central axis of a circular cross section. A flattened small circle shown at the center of the ellipse #1 indicates the direction of a rotation axis indicated by a long dashed short dashed line.

As indicated by a circle #2, the detachable member 251 is rotatable about an axis passing through a fitting portion 251B for fitting to the hinge portion 252. Furthermore, the relay member 253 is rotatable about an axis passing through a fitting portion 253A for fitting to the hinge portion 252.

Two small circles shown inside the circle #2 indicate directions of the corresponding rotation axes (directions perpendicular to a paper surface). Each of the range of motion of the detachable member 251 about the axis passing through the fitting portion 251B and the range of motion of the relay member 253 about the axis passing through the fitting portion 253A is, for example, a range of 90 degrees.

The relay member 253 is constituted by a member 253-1 on the distal end side and a member 253-2 on the proximal end side in a divided manner. As indicated by an ellipse #3, the relay member 253 is rotatable about the central axis of a circular cross section at a coupling portion 253B between the member 253-1 and the member 253-2. Other movable portions basically have similar ranges of motion.

As described above, the detachable member 251 having the detachable portion 251A at the distal end, the relay member 253 coupling the detachable member 251 and the base member 255, and the base member 255 to which the detachable portion 256 is connected at the proximal end are rotatably connected by the corresponding hinge portions. The motion of each movable portion is controlled by a controller in the cooking robot 2-4 in accordance with an instruction command.

Figure 24:
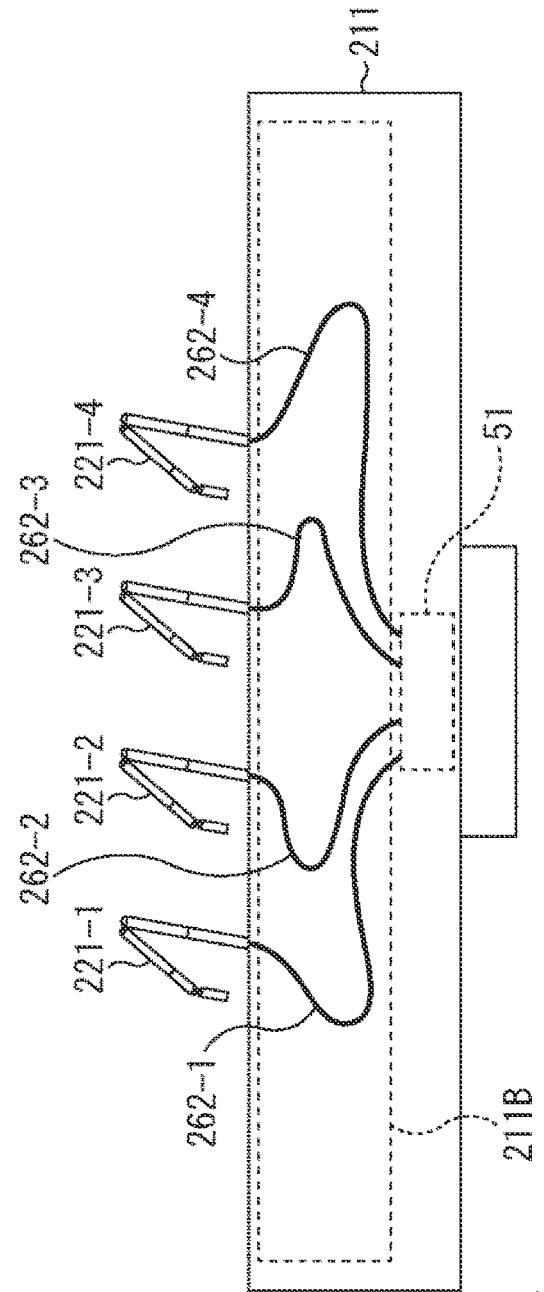
FIG. 24 is a diagram illustrating an example of connection between the cooking arm and a controller.

FIG. 24 is a diagram illustrating an example of connection between the cooking arm and the controller.

As illustrated in FIG. 24, the cooking arm 221 and the controller 51 are connected via a wiring in a space 211B formed inside the housing 211. In the example in FIG. 24, the cooking arms 221-1 to 221-4 are connected with the controller 51 via wirings 262-1 to 262-4, respectively. The wirings 262-1 to 262-4 having flexibility are flexed as appropriate in accordance with the positions of the cooking arms 221-1 to 221-4.

Cleaning Function

Figure 25:
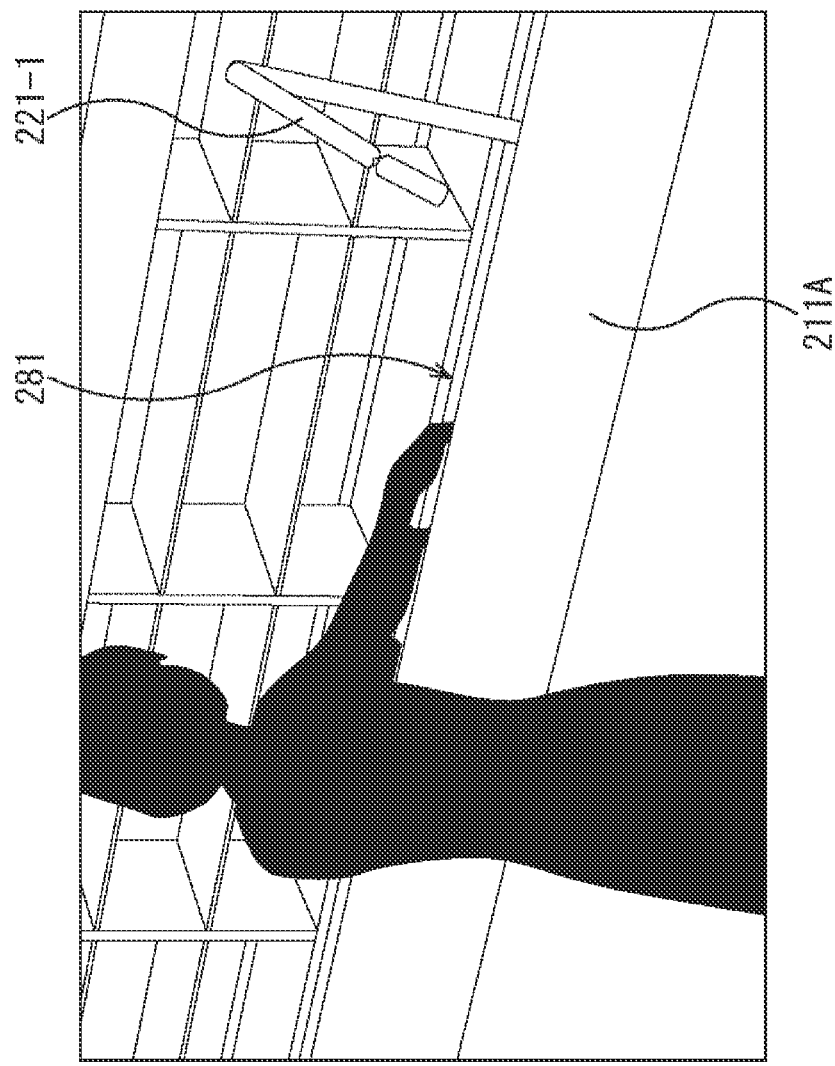
FIG. 25 is a diagram illustrating an example of how a groove disposed on a top plate of the cooking robot is used.

FIG. 25 is a diagram illustrating an example of how a groove 281 disposed in the cooking robot. 2-4 is used.

As illustrated in FIG. 25, the groove 281 is disposed in front of the cooking assistance system 212. The groove 281 has a cleaning function for washing a human hand put into the groove 281. As illustrated in FIG. 25, in a case where a user puts his or her hand into the groove 281, the cleaning function operates to clean, dry, and disinfect the hand.

Cooking by the cooking robot 2-4 can also be performed in such a way as to assist a human such as a chef to cook. In this case, a situation in which a human washes hands also occurs during cooking.

A user putting his or her hand into the groove 281 is detected by an infrared sensor or the like. A user putting his or her hand into the groove 281 may be detected by analysis of an image captured by a camera.

Figure 26:
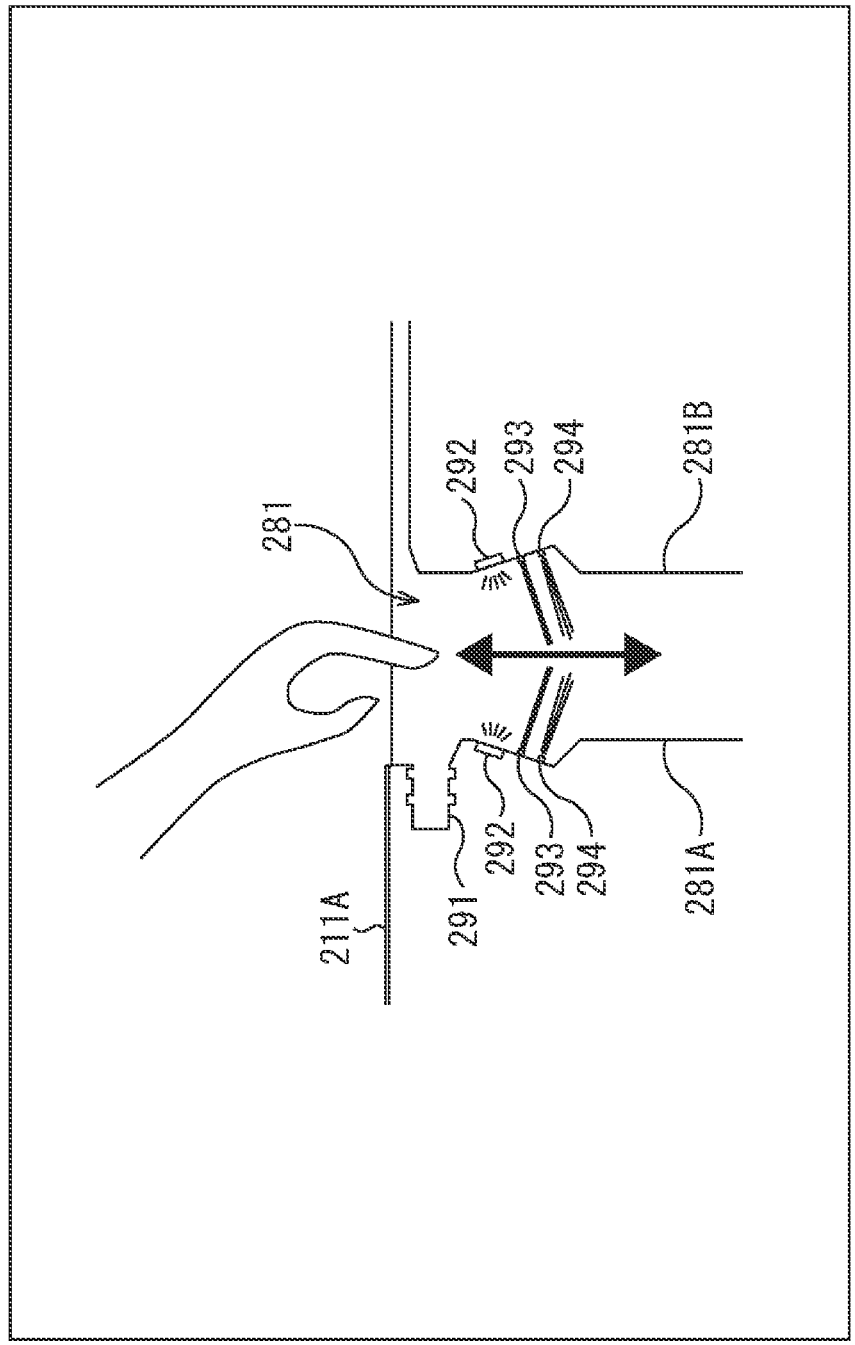
FIG. 26 is a diagram illustrating a cross section of the groove.

FIG. 26 is a diagram illustrating a cross section of the groove 281.

FIG. 26 is an enlarged view of the vicinity of an opening of the groove 281. The left side in FIG. 26 corresponds to the front side of the cooking robot 2-4, and the right side corresponds to the back side of the cooking robot 2-4. A side wall portion 281A is formed on the front side of the cooking robot 2-4, and a side wall portion 281B is formed on the back side.

Slopes that face slightly obliquely downward are formed in the vicinity of the upper ends of the side wall portion 281A and the side wall portion 281B. The slopes are disposed with an ultraviolet irradiation port 292 of an ultraviolet disinfection device, a jet air jetting port 293 of a hand dryer, and a water jetting port 294.

A user can clean, dry, and disinfect his or her hand at once by putting the hand into the groove 281 and withdrawing the hand as indicated by an arrow.

Note that, as illustrated in FIG. 26, a rail 291 is disposed at a position in the vicinity of the opening of the groove 281, which serves as an edge of the top plate 211.

A plurality of sets of the ultraviolet irradiation port 292, the jet air jetting port 293, and the water jetting port 294 that implement such a cleaning function is disposed at a predetermined interval in a longitudinal direction of the groove 281. The set at the position where a user has out his or her hand is driven to clean the hand.

Tableware, silverware, attachments attached to the cooking arm 221, and the like are also cleaned with use of the cleaning function of the groove 281. Not only cleaning but also drying and disinfection of tableware, silverware, and attachments are performed in a similar manner to those of a human hand.

For example, tableware and silverware are cleaned by the cooking arm 221 at the time of cleanup work. For cleaning of tableware or the like, tableware or the like gripped by the manipulator attachment is inserted into the groove 281.

Similarly, for cleaning of an attachment, the distal end of the cooking arm 221 is inserted into the groove 281 with the attachment attached to the cooking arm 221.

Cleaning of an ingredient may be performed in the groove 281. The time of cleaning, the motion of the cooking arm 221 at the time of cleaning, and the like are switched in accordance with the target of cleaning.

As described above, a component that performs cleaning in response to an operation of a user putting a hand or an operation of the cooking arm 221 putting tableware or the like is disposed in the groove 281 at a farther position when viewed from the front of the cooking robot. 2-4. Cleaning of a hand or the like is performed in the groove 281, and this allows for prevention of water splashing around.

The function to be operated may be switched in accordance with the target of cleaning. For example, in a case where the target of cleaning is a hand of a user or an attachment, each of cleaning, drying, and disinfection functions may be operated, and in a case where the target of cleaning is tableware, the cleaning and drying functions may be operated.

Object sensing by the sensor device 21 mounted on the cooking robot 2-4 having such a configuration is performed with use of a sensing algorithm in accordance with an object sensing condition that is set in accordance with the situation of the cooking robot 2-4 such as the situation of the cooking operation performed by the cooking robot 2-4. A sensing program for performing object sensing is adaptively selected in accordance with the object sensing condition and executed in the sensor device 21.

Specific Example of Sensing Algorithm

FIGS. 27 to 29 are diagrams illustrating examples of a sensing algorithm defined by a sensing program prepared in the cooking robot 2-4.

The sensing algorithms illustrated in FIG. 27 are used co measure the distance to the target object. Information showing a measurement result of the distance to the target object is output as sensor data from the sensor device 21 to, for example, the controller 51.

As illustrated in FIG. 27, for the sensor device 21 of the cooking robot 2-4, programs are prepared as sensing programs for object sensing used for distance measurement, each program defining one of algorithms A1 to A7.

The algorithm A1 has high responsiveness and is capable of immediately outputting an alert when a moving object comes into view.

Object sensing by the algorithm A1 is performed with an imaging resolution of a depth camera set to be lower than a reference resolution. Since the object sensing is performed on the basis of an image having a slightly lower resolution and a smaller data amount, an increased processing speed and improved responsiveness are obtained. Note that the depth camera is constituted by the stereo camera 32B.

The algorithm A2 has sufficient accuracy, for example, in millimeters, to determine uniformity.

Object sensing by the algorithm A2 is performed with the imaging resolution of the depth camera set to be higher than the reference resolution. Since the object sensing is performed on the basis of an image having a higher resolution and a larger data amount, the processing speed decreases and the responsiveness deteriorates, but the accuracy increases.

The algorithm. A3 is capable of measuring a distance to a water surface. For example, the algorithm A3 is used in a case of gripping an ingredient in water.

Object sensing by the algorithm. A3 uses a sensor such as the ToF sensor 32C that does not rely on visible light. Using the ToF sensor 32C makes it possible to measure a distance to a water surface.

The algorithm A4 is capable of measuring a distance even in a situation with steam. For example, the algorithm A4 is used in a case of gripping an ingredient in hot water.

Object sensing by the algorithm A4 is performed with use of an active sensor such as the ToF sensor 32C or the LiDAR 32F.

The algorithm A5 is capable of measuring a distance to a transparent utensil.

Object sensing by the algorithm A5 is performed with the imaging resolution of the stereo camera 32B set to be higher than the reference resolution.

The algorithm A6 is capable of measuring a distance to a highly reflective utensil.

Object sensing by the algorithm A6 is performed with use of a sensor that does not rely on visible light. For example, a sensor that performs ranging with use of a sound wave is used.

The algorithm A7 measures a distance with use of an output of the ToF sensor 32C or the like, other than RGB images.

The sensing algorithms illustrated in FIG. 28 are used to determine an attribute of a dish. Information showing a result of determination on the attribute of the dish is output as sensor data from the sensor device 21 to the controller 51, for example.

As illustrated in FIG. 28, for the cooking robot 2-4, programs are prepared as sensing programs for object sensing used to determine an attribute of a dish, each program defining one of algorithms A11 to A14.

The algorithm A11 determines which one of a Japanese style dish, a western style dish, and a Chinese style dish the dish as the target object is.

Object sensing by the algorithm A11 is performed with use of an inference model such as a neural network for the algorithm A11. For example, the sensing program that defines the algorithm A11 includes an inference model that has been generated by machine learning, uses an RGB image as an input, and uses information showing the attribute of the dish as an output.

The algorithm. A12 determines beauty of a Japanese style dish as a target object.

Object sensing by the algorithm Alt is performed with use of an inference model such as a neural network for the algorithm A12. For example, the sensing program that defines the algorithm A12 includes an inference model that has been generated by machine learning, uses an RGB image showing a Japanese style dish as an input, and uses information showing the beauty of the Japanese style dish as an output.

The algorithm A13 and the algorithm A14 determine the beauty of a western style dish and a Chinese style dish as target objects, respectively.

Object sensing by the algorithm A13 and the algorithm A14 is performed with use of an inference model for each algorithm, similarly to the algorithm A12.

The sensing algorithms illustrated in FIG. 29 are used to determine the state of an object used for cooking. Information showing a result of determination on the state of the object is output as sensor data from the sensor device 21 to the controller 51, for example.

As illustrated in FIG. 29, for the sensor device 21 of the cooking robot. 2-4, programs are prepared as sensing programs for object sensing used to determine a state of an object, each program defining one of algorithms A21 to A33. The algorithms A21 to A33 are used to determine a state of a predetermined object such as the type of the target object, the state of dirt on the target object, and the state of dryness of the target object.

Object sensing by each of the algorithms A21 to A33 is performed on the basis of an output of a different sensor or on the basis of an output obtained by setting a different parameter to the same sensor. Furthermore, in the object sensing by the algorithms A21 to A33, different pieces of processing are performed on the basis of outputs of the same sensor.

FIG. 30 is a diagram illustrating an example of a sensing algorithm in accordance with a cooking operation.

As illustrated in FIG. 30, the cooking operation of the cooking robot 2-4 includes three categories of operations, cooking, arrangement, and cleanup. A usable sensing algorithm is set for a use case of the cooking operation of each category.

The example in FIG. 30 illustrates a use case of cutting an ingredient, a use case of applying cream to a cake, and a use case of putting an ingredient into a pot filled with cold or hot water as use cases of a cooking operation in the category of cooking. For these use cases, the algorithms A1, A2, A3, and A4 are set as usable sensing algorithms.

For example, in the case of cutting an ingredient, distance measurement is performed with use of the algorithm A1.

Furthermore, in the case of applying cream to the cake, distance measurement is performed with the algorithm switched from the algorithm. A1 to the algorithm A2.

In the case of putting an ingredient into a pot filled with cold or hot water, distance measurement is performed with the algorithm switched from the algorithm. A1 to the algorithm. A3 or the algorithm A4.

As use cases of a cooking operation in the category of arrangement, a use case of arrangement on a transparent utensil, a use case of arrangement on a highly reflective metal utensil, and a use case of arrangement on a utensil or a liquid having a uniform color are illustrated. For these use cases, the algorithms A1, A5, A6, and A7 are set as usable sensing algorithms.

For example, in the case of arranging an ingredient on a transparent utensil, distance measurement is performed with use of the algorithm A5.

Furthermore, as a use case of the cooking operation in the category of arrangement, a use case of arranging an ingredient and determining the beauty of the completed dish is illustrated. For this use case, the algorithms A11, A12, A13, and A14 are set as usable sensing algorithms.

For example, when arrangement of an ingredient has been finished, the style of the dish is determined with use of the algorithm A11, and the beauty of the dish is determined with use of a sensing algorithm in accordance with the style of the dish.

As a use case of a cooking operation in the category of arrangement, a use case of checking whether or not a correct plate is used before arrangement of ingredients is illustrated. For this use case, the algorithm A21 is set as a usable sensing algorithm.

As a use case of a cooking operation in the category of cleanup, a use case is illustrated in which the kind and the material of a plate to be cleaned up are determined, and the plate is washed with an appropriate washing method and then cleaned up. For this use case, the algorithms A21 and A22 are set as usable sensing algorithms.

FIG. 31 is a diagram illustrating another example of transition of the sensing algorithm in accordance with the cooking operation.

In the example in FIG. 31, a usable sensing algorithm is set for each use case regarding cleanup after cooking curry.

For example, algorithms A23, A24, A25, and A26 are set as usable sensing algorithms for use cases in which a chef washes his or her hands.

In a case where a chef has washed his or her hands, the algorithm A23 is used to determine that the target object being washed in the groove 281 is the hands of the chef, and the algorithm A24 is used to determine the degree of dirt on the hands. Furthermore, the algorithm A25 is used to recognize that the hands being washed in the groove 281 belong to the chef (an individual is identified), and the algorithm A26 is used to determine the degree of dryness of the hands.

As described above, in the sensor device 21, object sensing is performed by a sensing algorithm in accordance with the object sensing condition that it is a situation to perform the cooking operation of a certain use case.

<Configuration. Of Each Device>
Configuration of Data Processing Device 101

Figure 32:
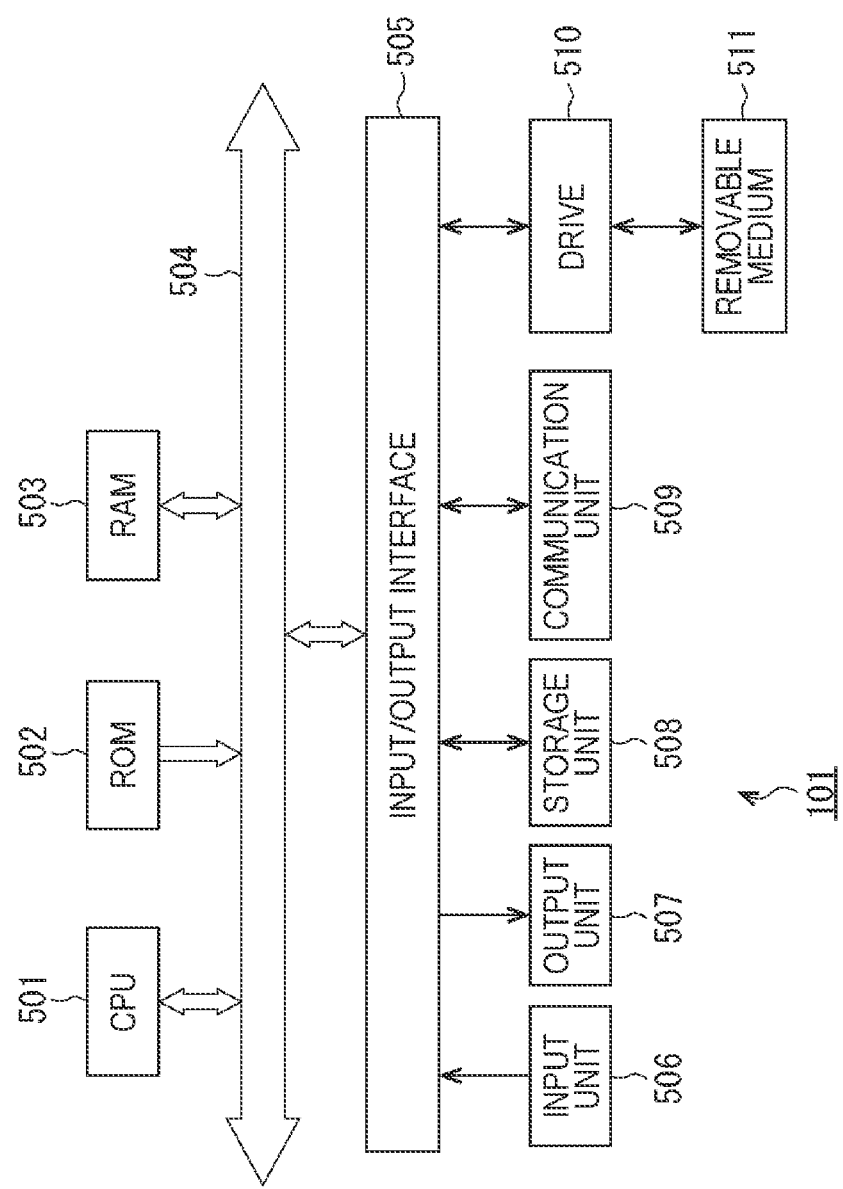
FIG. 32 is a block diagram illustrating a configuration example of hardware of the data processing device.

FIG. 32 is a block diagram illustrating a configuration example of hardware of the data processing device 101.

As illustrated in FIG. 32, the data processing device 101 is constituted by a computer. A central processing unit (CPU) 501, a read only memory (ROM) 502, and a random access memory (RAM) 503 are connected to each other by a bus 504.

The bus 504 is further connected with an input/output interface 505. The input/output interface 505 is connected with an input unit 506 constituted by a keyboard, a mouse, or the like, and an output unit 507 constituted by a display, a speaker, or the like.

Furthermore, the input/output interface 505 is connected with a storage unit 508 constituted by a hard disk, a non-volatile memory, or the like, a communication unit 509 constituted by a network interface or the like, and a drive 510 that drives a removable medium 511.

To perform various types of processing, the computer configured as described above causes the CPU 501 to, for example, load a program stored in the storage unit 508 into the RAM 503 via the input/output interface 505 and the bus 504 and then execute the program.

Figure 33:
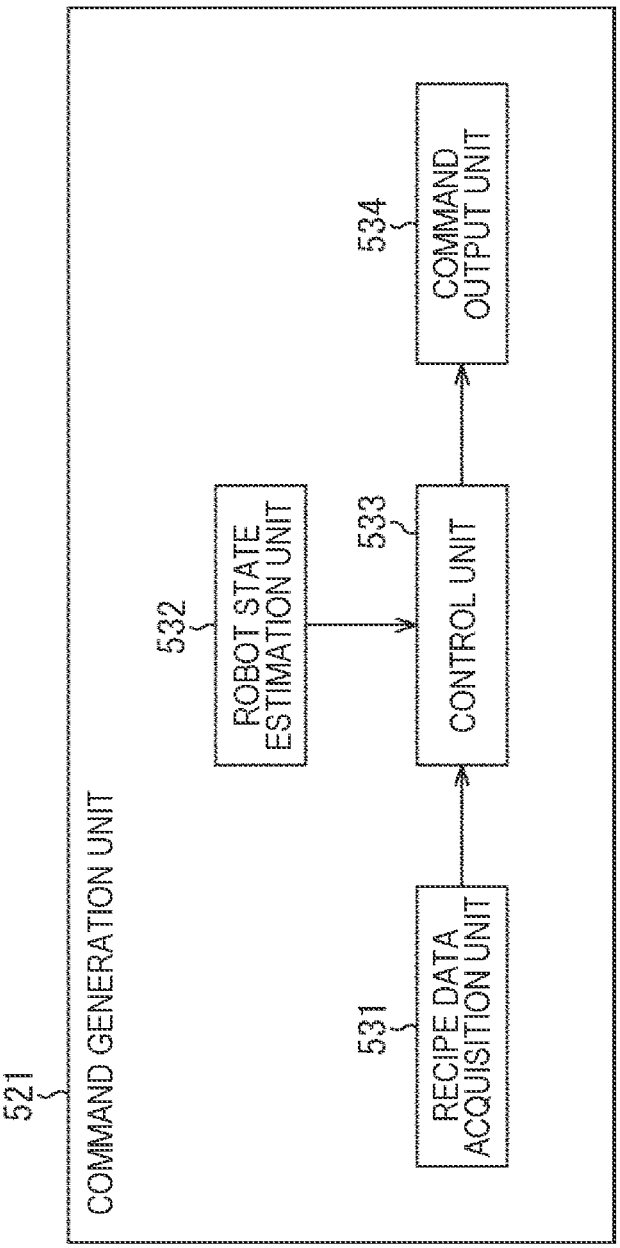
FIG. 33 is a block diagram illustrating a functional configuration example of the data processing device.

FIG. 33 is a block diagram illustrating a functional configuration example of the data processing device 101.

At least one of functional units illustrated in FIG. 33 is implemented by the CPU 501 in FIG. 32 executing a predetermined program.

As illustrated in FIG. 33, a command generation unit 521 is implemented in the data processing device 101. The command generation unit 521 includes a recipe data acquisition unit 531, a robot state estimation unit 532, a control unit 533, and a command output unit 534.

The recipe data acquisition unit 531 acquires recipe data generated by a device (not illustrated) and outputs the recipe data to the control unit 533.

The robot state estimation unit 532 receives an image and sensor data transmitted from the cooking robot 2-4. From the cooking robot 2-4, an image captured by the camera of the cooking robot 2-4 and sensor data measured by a sensor disposed at a predetermined position in the cooking robot 2-4 are transmitted at a predetermined cycle. The image and the sensor data transmitted from the cooking robot 2-4 also include data of a result of sensing by the sensor device 21 mounted on the cooking robot 2-4. The image captured by the camera of the cooking robot 2-4 shows the state around the cooking robot 2-4.

The robot state estimation unit 532 analyzes the image and the sensor data transmitted from the cooking robot 2-4 to estimate the state around the cooking robot. 2-4 and the state of the cooking process such as the state of the cooking arms 221 and the state of an ingredient. Information indicating, for example, the state around the cooking robot. 2-4 estimated by the robot state estimation unit 532 is supplied to the control unit 533.

The control unit 533 generates an instruction command for controlling the cooking robot 2-4 on the basis of the cooking process data set described in the recipe data supplied from the recipe data acquisition unit 531. For example, an instruction command for causing the cooking arm 221 to perform an operation as indicated by the cooking operation information included in the cooking process data set is generated.

The instruction command is generated also with reference to, for example, the state around the cooking robot 2-4 estimated by the robot state estimation unit 532. The instruction command generated by the control unit 533 is supplied to the command output unit 534.

The command output unit 534 transmits the instruction command generated by the control unit 533 to the cooking robot 2-4.

Configuration of Cooking Robot 2-4

Figure 34:
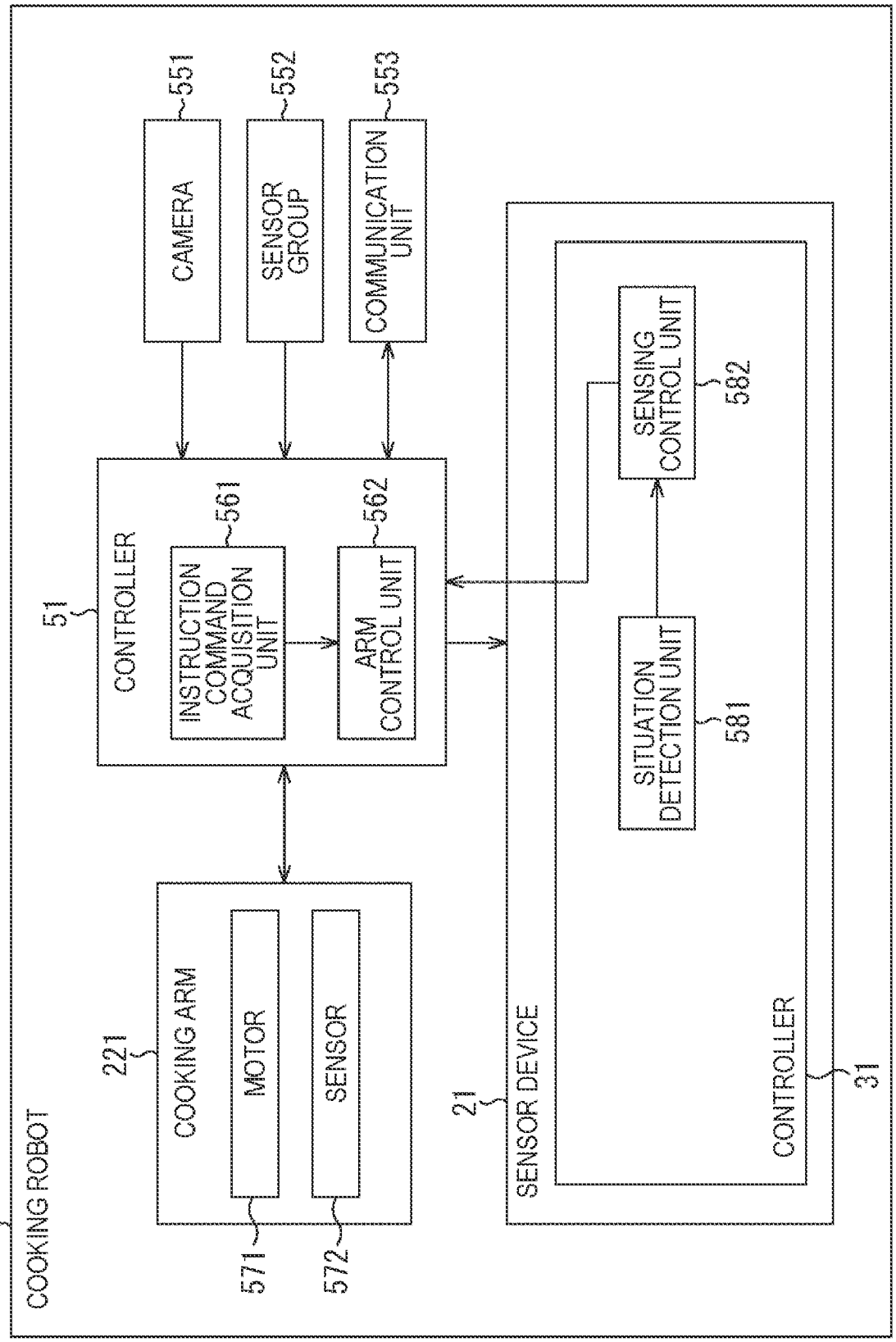
FIG. 34 is a block diagram illustrating a configuration example of the cooking robot.

FIG. 34 as a block diagram illustrating a configuration example of the cooking robot 2-4.

The cooking robot 2-4 has a configuration in which each unit is connected to the controller 51 (FIGS. 13 and 24) as a control device that controls the operation of the cooking robot 2-4. Among the components illustrated in FIG. 34, the same components as those described above are denoted by the same reference numerals. Duplicate descriptions will be omitted as appropriate.

In addition to the cooking arm 221 and the sensor device 21, a camera 551, a sensor group 552, and a communication unit 553 are connected to the controller 51.

The controller 51 is constituted by a computer having a CPU, a RUM, a RAM, a flash memory, and the like. The controller 51 causes the CPU to execute a predetermined program to control the entire operation of the cooking robot 2-4. The data processing device 101 may be constituted by the controller 51.

For example, the controller 51 controls the communication unit 553 to transmit, to the data processing device 101, an image captured by a camera constituting the sensor device 21 and sensor data measured by a sensor constituting the sensor device 21. Furthermore, the controller 51 controls the communication unit 553 to transmit, to the data processing device 101, an image captured by the camera 551 and sensor data measured by each sensor constituting the sensor group 552.

In the controller 51, a predetermined program is executed to implement an instruction command acquisition unit 561 and an arm control unit 562.

The instruction command acquisition unit 561 acquires an instruction command transmitted from the data processing device 101 and received by the communication unit 553. The instruction command acquired by the instruction command acquisition unit 561 is supplied to the arm control unit 562.

The arm control unit 562 controls the operation of the cooking arm 221 in accordance with the instruction command acquired by the instruction command acquisition unit 561.

The camera 551 images the state around the cooking robot 2-4, and outputs an image obtained by the imaging to the controller 51. The camera 551 is disposed at a variety of positions such as the front of the cooking assistance system 212 and the distal end of the cooking arm 221.

The sensor group 552 is constituted by various sensors such as a temperature and humidity sensor, a pressure sensor, an optical sensor, a distance sensor, a human detection sensor, a positioning sensor, and a vibration sensor. Measurement by the sensor group 552 is performed at a predetermined cycle. Sensor data indicating results of measurement by the sensor group 552 is supplied to the controller 51.

The communication unit 553 is a wireless communication module such as a wireless LAN module or a mobile communication module that supports long term evolution (LTE). The communication unit 553 communicates with the data processing device 101 and a device on the outside such as a server on the Internet.

As illustrated in FIG. 34, the cooking arm 221 is disposed with a motor 571 and a sensor 572.

The motor 571 is disposed at each joint of the cooking arm 221. The motor 571 performs a rotation operation about an axis under the control of the arm control unit 562. An encoder that measures the amount of rotation of the motor 571, a driver that adaptively controls the rotation of the motor 571 on the basis of a result of measurement by the encoder, and the like are also disposed at each joint. The motor 571 functions as a drive unit that controls driving of the cooking arm 221.

The sensor 572 is constituted by, for example, a gyro sensor, an acceleration sensor, and a touch sensor. The sensor 572 measures an angular velocity, acceleration, and the like of each Mint during operation of the cooking arm 221, and outputs information indicating a result of the measurement to the controller 51. Sensor data indicating a result of measurement by the sensor 572 is also transmitted from the cooking robot 2-4 to the data processing device 101 as appropriate.

In the controller 31 of the sensor device 21, a situation detection unit 581 and a sensing control unit 582 are implemented. The sensor device 21 is a data processing device that controls a sensing algorithm.

The situation detection unit 581 detects a situation of the cooking operation of the cooking robot 2-4. The situation of the cooking operation of the cooking robot 2-4 is detected, for example, on the basis of an instruction command transmitted from the data processing device 101. Furthermore, the situation of the cooking operation of the cooking robot 2-4 is detected on the basis of an image captured by the camera 551, sensor data output by a sensor constituting the sensor group 552, or sensor data output by a sensor disposed in the sensor device 21.

The situation of the cooking operation of the cooking robot 2-4 includes, for example, the operation of the cooking robot 2-4 such as the kind of cooking operation being performed including the use cases described above. Furthermore, the situation of the cooking operation of the cooking robot 2-4 also includes a situation on the outside such as the situation of a chef and the situation of an ingredient or a dish made by the cooking operation of the cooking robot 2-4. The place of the cooking robot 2-4 and the weather, temperature, humidity, and brightness of the place where the cooking robot 2-4 is installed may be included in the situation of the cooking operation of the cooking robot 2-4.

The situation detection unit 581 out information showing such a situation of the cooking operation of the cooking robot. 2-4 to the sensing control unit 582.

The sensing control unit 582 selects a sensing algorithm in accordance with an object sensing condition that object sensing is performed in a situation detected by the situation detection unit 581, and executes a sensing program that defines the selected sensing algorithm.

For example, each object sensing condition is associated with a sensing algorithm or a sensing program. The sensing control unit 582 uses an ID as identification data to select a sensing algorithm or a sensing program in accordance with the object sensing condition. A sensing program set may be selected in accordance with the object sensing condition.

The sensing control unit. 582 executes a sensing program to drive each sensor disposed in the sensor device 21, and outputs sensor data to the controller 51 on the basis of an output of each sensor.

<Operation of Cooking Robot>

Here, the operation of the cooking robot 2-4 having a configuration as described above will be described.

Use Case of Cooking (Cutting of Ingredient)

In a case where a cooking operation of cutting an ingredient such as a carrot, a Japanese radish, or a cabbage with a kitchen knife is performed on the basis of recipe data, the cooking robot. 2-4 recognizes the position of the ingredient and performs an operation of gripping the ingredient with the cooking arm 221. Furthermore, the cooking robot 2-4 recognizes the position of the kitchen knife and performs an operation of gripping the kitchen knife with the cooking arm 221.

After the ingredient has been gripped with one of the cooking arms 221 and the kitchen knife has been gripped with another cooking arm 221, the cooking robot 2-4 performs a cooking operation of cutting the ingredient by driving the cooking arm 221 to move the gripped kitchen knife up and down at a different place.

A result of distance measurement by the depth camera disposed in the sensor device 21 is used for grasping the position of the ingredient and controlling a movement destination or goal of the kitchen knife. Furthermore, the result of distance measurement by the depth camera is used for grasping the position of the kitchen knife and a feedback of the control of the kitchen knife.

An RGB image captured by the RGB camera 32A disposed in the sensor device 21 is used for recognition of an ingredient, recognition of a kitchen knife, recognition of an object that hinders an operation of cutting the ingredient, and the like.

Processing of the cooking robot 2-4 cutting an ingredient will be described with reference to a flowchart in FIG. 35.

In step S1, the controller 51 designates an ingredient to be cooked for the sensor device 21 on the basis of the contents of an instruction command supplied from the data processing device 101, for example. As described above, each piece of processing by the controller 51 is performed under the control of the control unit 533 of the data processing device 101.

In step S2, the sensing control unit 582 of the sensor device 21 performs sensing of the ingredient by the depth camera at high speed.

Here, in accordance with an object sensing condition that it is a situation to detect an ingredient to be cooked, the sensing control unit 582 selects a sensing algorithm for sensing the ingredient by driving the depth camera at high speed. The sensing control unit 562 executes a sensing program that defines the selected sensing algorithm, and outputs sensor data showing a sensing result to the controller 51.

In step S3, the arm control unit 562 of the controller 51 moves the cooking arm 221 near the ingredient.

In step S4, the sensing control unit 582 of the sensor device 21 recognizes the ingredient on the basis of an RGB image captured by the RGB camera 32A.

Here, in accordance with an object sensing condition that it is a situation to recognize the designated ingredient, the sensing control unit 582 selects a sensing algorithm for recognizing the ingredient on the basis of the RGB image. The sensing control unit 582 executes a sensing program that defines the selected sensing algorithm, and outputs, to the controller 51, sensor data showing a result of recognition using the RGB image.

In step S5, the controller 51 determines whether or not the recognized ingredient is an ingredient to be cooked. If it has been determined in step S5 that the ingredient is not the ingredient to be cooked, the processing returns to step S2, and the processing described above is repeated.

If it has been determined in step S5 that the recognized ingredient is the ingredient to be cooked, the controller 51 performs ingredient cutting processing in step S6. Details of the ingredient cutting processing will be described later with reference to a flowchart in FIG. 36. After the ingredient cutting processing, the processing in FIG. 35 ends.

Next, the ingredient cutting processing performed in step S6 in FIG. 35 will be described with reference to the flowchart in FIG. 36.

In step S11, the controller 51 determines whether or not the way of cutting the ingredient is slicing on the basis of the contents of the instruction command supplied from the data processing device 101, for example. In this example, it is assumed that slicing and chopping into chunks have been set as ways of cutting the ingredient.

If it has been determined in step 311 that the way of cutting the ingredient is slicing, in step S12, the sensing control unit 582 of the sensor device 21 performs sensing of the distance to the ingredient with high definition and at low speed.

Here, in accordance with an object sensing condition that it is a situation to slice the ingredient, the sensing control unit 582 selects a sensing algorithm for sensing the distance to the ingredient with high definition (with high accuracy) and at low speed. The sensing control unit 582 executes a sensing program that defines the selected sensing algorithm, and outputs, to the controller 51, sensor data showing a measurement result of the distance cc the ingredient.

On the other hand, if it has been determined in step S11 that the way of cutting the ingredient is not slicing but chopping into chunks, in step S13, the sensing control unit 582 of the sensor device 21 performs sensing of the distance to the ingredient with low definition and at high speed.

Here, in accordance with an object sensing condition that it is a situation to chop the ingredient into chunks, the sensing control unit 582 selects a sensing algorithm for sensing the distance to the ingredient with low definition (with low accuracy) and at high speed. The sensing control unit 582 executes a sensing program that defines the selected sensing algorithm, and outputs, to the controller 51, sensor data showing a measurement result of the distance to the ingredient.

After high-definition object sensing has been performed in step S12 or low-definition object sensing has been performed in step S13, the processing proceeds to step S14.

In step S14, the arm control unit 562 of the controller 51 drives the cooking arm 221 to cut the ingredient on the basis of the result of sensing by the sensing control unit 582.

In step S15, the arm control unit 562 of the controller 51 determines whether or not cutting of the ingredient has been finished.

If it has been determined in step S15 that cutting of the ingredient has not been finished, the processing returns to step S11, and the processing described above is repeated. The object sensing for an ingredient as a target is repeated while a series of cutting is performed.

Figure 35:
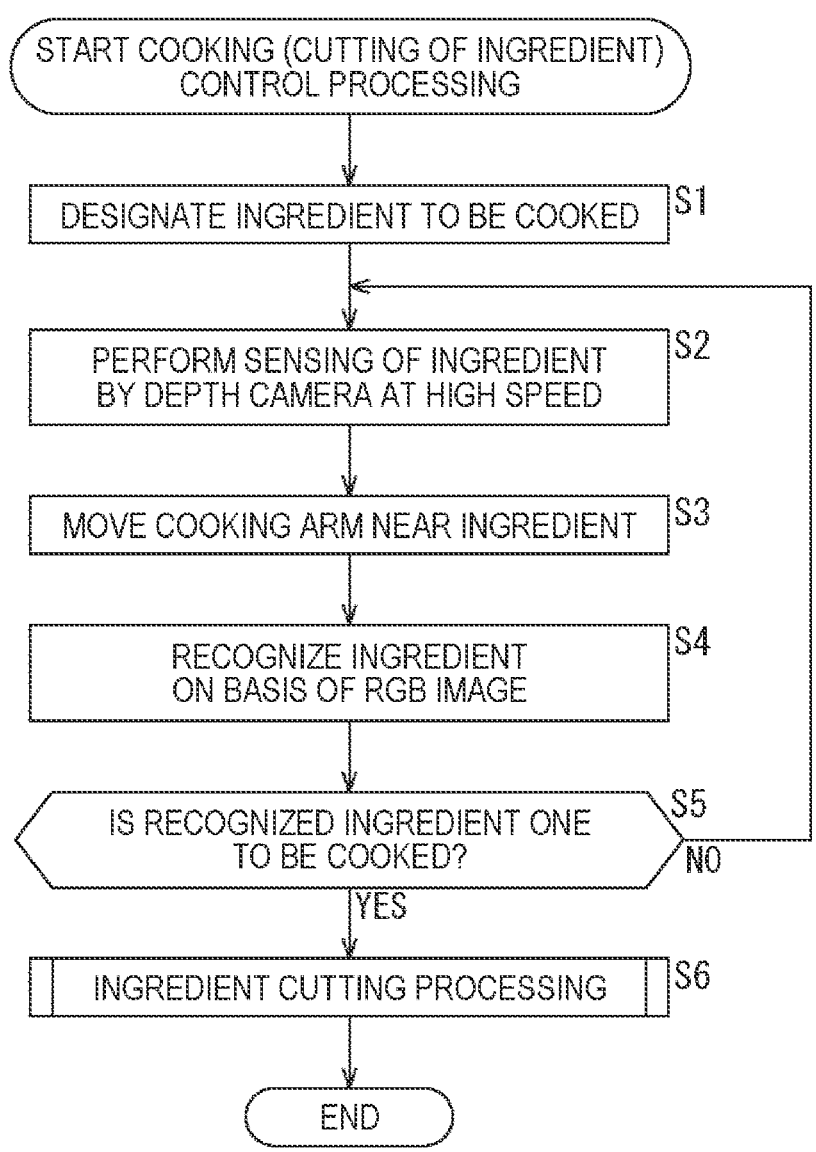
FIG. 35 is a flowchart illustrating processing of controlling the cooking robot to cut an ingredient.
Figure 36:
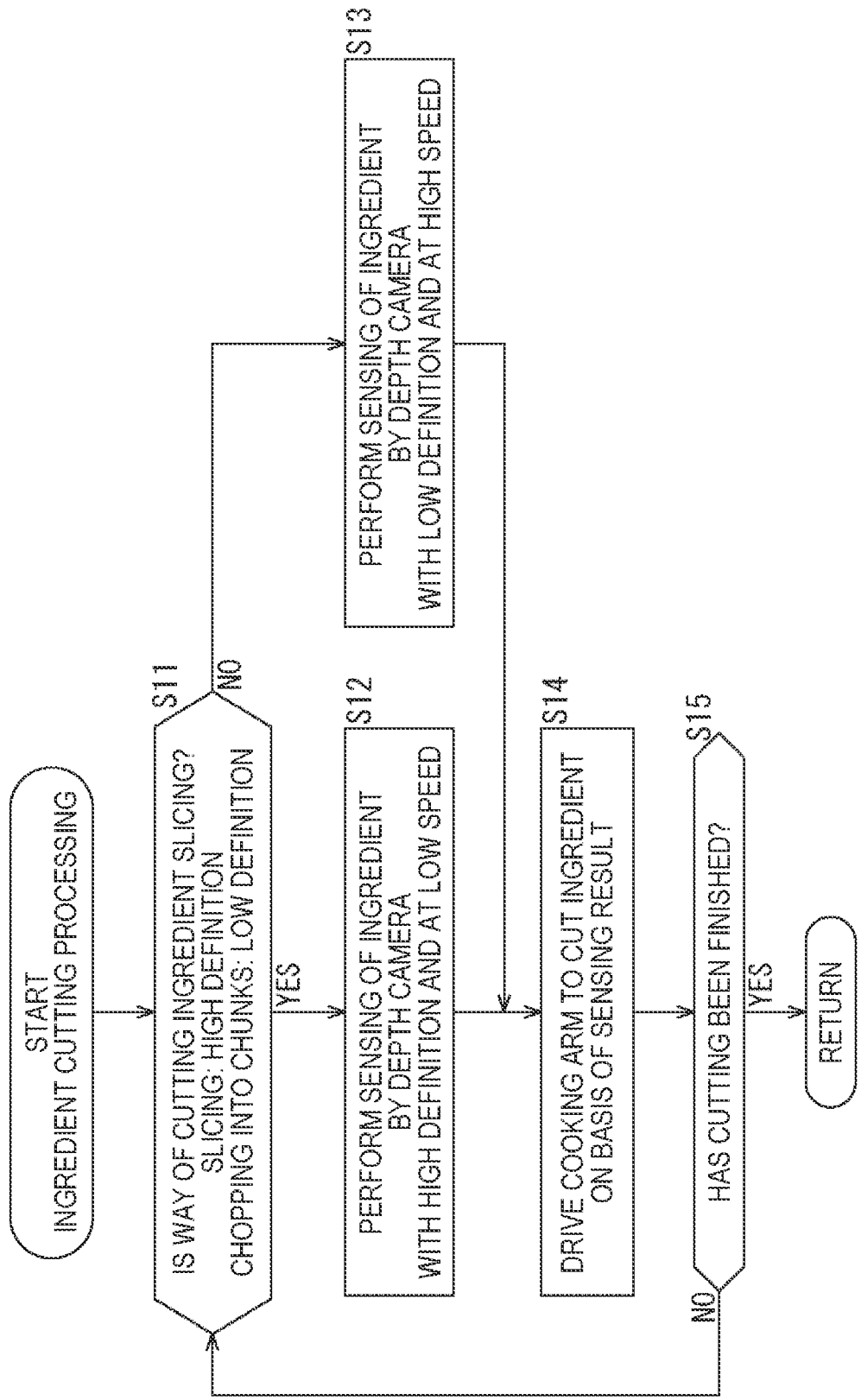
FIG. 36 is a flowchart illustrating ingredient cutting processing performed in step S6 in FIG. 35.

If it has been determined in step S15 that cutting of the ingredient has finished, the processing returns to step S6 in FIG. 35, and the subsequent processing is performed.

Figure 37:
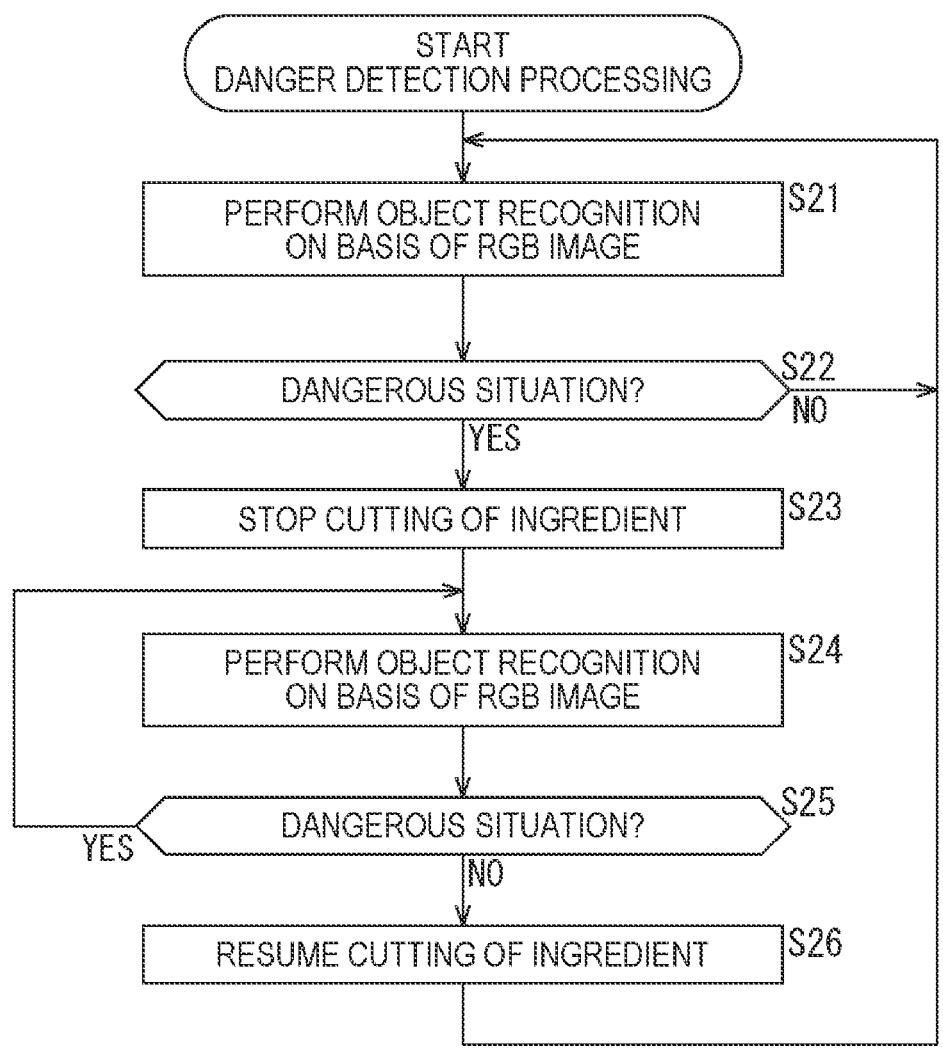
FIG. 37 is a flowchart illustrating processing of detecting a danger related to the cooking robot.

Processing of detecting a danger related to the cooking robot 2-4 will be described with reference to a flowchart in FIG. 37. The processing in FIG. 37 is, for example, performed in parallel with the processing in FIG. 36.

In step S21, the sensing control unit 582 of the sensor device 21 performs object recognition on the basis of an RGB image captured by the RGB camera 32A.

Here, in accordance with an object sensing condition that it is a situation to recognize an object that poses a danger to the cooking process, the sensing control unit. 582 selects a sensing algorithm for recognizing an object that poses a danger. The sensing control unit 582 executes a sensing program that defines the selected sensing algorithm, and outputs sensor data showing an object recognition result to the controller 51.

In step S22, the controller 51 determines whether or not it is a dangerous situation on the basis of a result of recognition by the sensor device 21. For example, in a case where there is a human, hand near the cooking arm 221 that is cutting the ingredient, it is determined that it is a dangerous situation. Until it is determined in step S22 that it is a dangerous situation, the processing returns to step S21, and the object recognition by the sensor device 21 is repeated.

If it has been determined in step S22 that it is a dangerous situation, in step S23, the arm control unit 562 of the controller 51 stops cutting of the ingredient by the cooking arm 221.

In step S24, the sensing control unit 582 of the sensor device 21 performs object recognition on the basis of an RGB image captured by the RGB camera 32A.

In step S25, the controller 51 determines whether or not the dangerous situation continues on the basis of a result of recognition by the sensor device 21.

If it has been determined in step S25 that the dangerous situation continues, the processing returns to step S24, and the state in which the cutting of the ingredient has been stopped is maintained.

On the other hand, if it has been determined in step S25 that it is no longer a dangerous situation, in step S26, the arm control unit 562 of the controller 51 drives the cooking arm 221 to resume the cutting of the ingredient. Thereafter, the processing returns to step S21, and the subsequent processing is performed.

With the above processing, the cooking robot 2-4 can select a sensing algorithm in accordance with the situation of the cooking process such as how the ingredient is to be cut, and perform object sensing. Furthermore, the cooking robot 2-4 can control the cooking operation of cutting with the cooking arm 221 on the basis of a result of the object sensing performed with use of the sensing algorithm selected in accordance with such a situation of the cooking process.

Use Case of Arrangement

In a case where a cooking operation of arranging a cooked ingredient on tableware is performed on the basis of recipe data, the cooking robot 2-4 recognizes the position of the ingredient and performs an operation of gripping the ingredient with the cooking arm 221. Furthermore, the cooking robot. 2-4 recognizes the position of the tableware prepared on the top plate 211A, for example.

After the ingredient has been gripped with the cooking arm 221, the cooking robot 2-4 performs a cooking operation of arranging the ingredient by driving the cooking arm 221 to move the ingredient onto the tableware.

A result of distance measurement by the depth camera disposed in the sensor device 21 is used for grasping the position of the tableware and controlling the movement destination or goal of the ingredient. Furthermore, the result of distance measurement by the depth camera is used for giving a feedback on control regarding moving the ingredient.

An RGB image captured by the RGB camera 32A disposed in the sensor device 21 is used for recognition of an ingredient, recognition of tableware, and the like.

Figure 38:
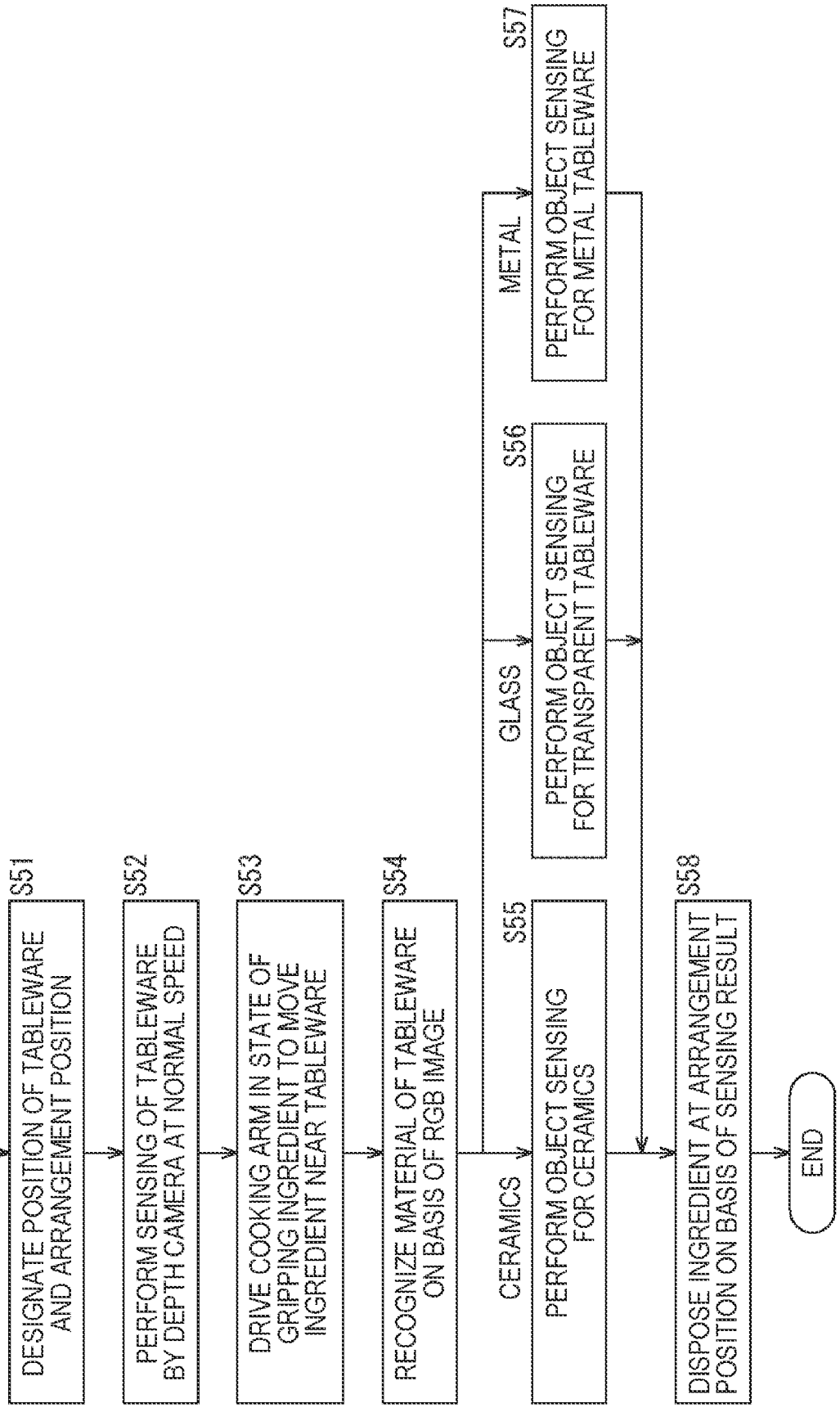
FIG. 38 is a flowchart illustrating processing of controlling arrangement by the cooking robot.

Processing of the cooking robot 2-4 performing arrangement will be described with reference to a flowchart in FIG. 38.

In step S51, the controller 51 designates the position of the tableware and an arrangement position for the sensor device 21 on the basis of the contents of an instruction command supplied from the data processing device 101, for example. In this example, it is assumed that an ingredient to be arranged is gripped with one of the cooking arms 221.

In step S52, the sensing control unit 582 of the sensor device 21 performs sensing of the tableware by the depth camera at normal speed.

Here, in accordance with an object sensing condition that it is a situation to detect the position of the tableware, the sensing control unit 582 selects a sensing algorithm for sensing the tableware by driving the depth camera at normal speed. The sensing control unit 582 executes a sensing program that defines the selected sensing algorithm, and outputs sensor data showing a sensing result to the controller 51.

In step S53, the arm control unit 562 of the controller 51 drives the cooking arm 221 in a state of gripping the ingredient to move the ingredient near the tableware.

In step 654, the sensing control unit 582 of the sensor device 21 recognizes the material of the tableware on the basis of an RGB image captured by the RGB camera 32A.

Here, in accordance with an object sensing condition that it is a situation to recognize the material of the tableware, the sensing control unit 562 selects a sensing algorithm for recognizing the material of the tableware on the basis of the RGB image. The sensing control unit 582 executes a sensing program that defines the selected sensing algorithm, and outputs sensor data showing a sensing result to the controller 51.

In a case where it has been recognized that the material of the tableware is ceramics, in step 655, the sensing control unit 582 of the sensor device 21 controls the depth camera to perform object sensing for ceramics.

Here, in accordance with an object sensing condition that it is a situation to measure the distance to the ceramic tableware, the sensing control unit 582 selects a sensing algorithm for measuring the distance to the ceramic tableware. The sensing control unit 582 executes a sensing program that defines the selected sensing algorithm, and outputs sensor data showing a sensing result to the controller 51.

On the other hand, in a case where it has been recognized that the material of the tableware is glass, in step S56, the sensing control unit 582 of the sensor device 21 controls the depth camera to perform object sensing for glass. In object sensing for glass, for example, the algorithm A5 (FIG. 27), which is an algorithm capable of measuring the distance to a transparent utensil, is used.

Furthermore, in a case where it has been recognized that the material of the tableware is metal, in step S57, the sensing control unit 582 of the sensor device 21 controls the depth camera to perform object sensing for metal. In object sensing for metal, for example, the algorithm A6 (FIG. 27), which is an algorithm capable of measuring the distance to a highly reflective utensil, is used.

In steps S56 and S57 as well, a sensing algorithm in accordance with the material of the tableware is selected, and a sensing program is executed.

After the object sensing for the tableware as a target has been performed in steps S55, S56, and S57 and the position of the tableware to be used for arrangement has been specified, the processing proceeds to step S58.

In step S58, the arm control unit 562 of the controller 51 drives the cooking arm 221 in a state of gripping the ingredient to dispose the ingredient at the arrangement position on the basis of the result of sensing by the sensing control unit 562. Thereafter, the processing ends.

With the above processing, the cooking robot. 2-4 can select a sensing algorithm in accordance with the situation of the cooking process such as the material of the tableware used for arrangement, and perform object sensing. Furthermore, the cooking robot 2-4 can control the cooking operation of arrangement with the cooking arm. 221 on the basis of a result of the object sensing performed with use of the sensing algorithm selected in accordance with such a situation of the cooking process.

Use Case of Cleanup (Cleaning)

In a case where a cooking operation in which tableware is washed before cleanup is performed on the basis of recipe data, the cooking robot. 2-4 recognizes the type of tableware to be cleaned and recognizes dirt on the tableware.

Furthermore, after the tableware has been gripped with the cooking arm 221, the cooking robot 2-4 drives the cooking arm 221 to move the tableware to the groove 281, and performs a cooking operation of cleaning and drying the tableware.

A result of distance measurement by the depth camera disposed in the sensor device 21 is used for grasping the position of the tableware and controlling the movement destination of the tableware. Furthermore, the result of distance measurement by the depth camera is used for a feedback on control regarding moving the tableware.

An RGB image captured by the RGB camera 32A disposed in the sensor device 21 is used for recognition of tableware, recognition of dirt, and the like.

Not only tableware but also a cooking tool, silverware, and a human hand are set as targets of cleaning as appropriate.

Processing of the cooking robot 2-4 cleaning tableware will be described with reference to a flowchart in FIG. 39.

In step S71, the sensing control unit 582 of the sensor device 21 recognizes the type of the target of cleaning on the basis of an RGB image captured by the RGB camera 32A. For example, an object carried to the groove 281 is set as a target of cleaning, and the type of the target of cleaning is recognized.

Here, in accordance with an object sensing condition that it is a situation to recognize the type of the target of cleaning, a sensing algorithm for recognizing the type of the target of cleaning on the basis of the RGB image is selected. The sensing control unit 582 executes a sensing program that defines the selected sensing algorithm, and outputs sensor data showing a sensing result to the controller 51 as appropriate.

In a case where it has been recognized that the target of cleaning is a human hand, in step S72, the sensing control unit 582 of the sensor device 21 performs dirt recognition for a human hand as a target on the basis of an RGB image captured by the RGB camera 32A.

Here, in accordance with an object sensing condition that it is a situation to recognize dirt on the human hand, the sensing control unit 582 selects a sensing algorithm for recognizing dirt on the human hand on the basis of the RGB image. The sensing control unit 582 executes a sensing program that defines the selected sensing algorithm, and outputs sensor data showing a sensing result to the controller 51.

By the dirt recognition by the sensor device 21, for example, it is recognized whether or not the degree of dirt is mild and whether the type of dirt is grease or another type of dirt.

On the other hand, in a case where it has been recognized that the target of cleaning is tableware, in step 373, the sensing control unit 582 of the sensor device 21 performs dirt recognition for tableware as a target on the basis of an RGB image captured by the RGB camera 32A.

Furthermore, in a case where it has been recognized that the target of cleaning is a cooking utensil (tool), in step S74, the sensing control unit 582 of the sensor device 21 performs dirt recognition for a cooking tool as a target on the basis of an RGB image captured by the RGB camera 32A.

In steps S73 and S74 as well, a sensing algorithm in accordance with the target of cleaning is selected, and a sensing program is executed.

After the dirt recognition for the target of cleaning has been performed as object sensing, the controller 51 performs cleaning processing in step S75. Details of the cleaning processing will be described later with reference to a flowchart in FIG. 40.

In step S76, the controller 51 controls an air blowing unit disposed in the groove 281 to dry the target of cleaning that has been subjected to the cleaning processing. Thereafter, the processing in FIG. 39 ends.

Next, the cleaning processing performed in step S75 in FIG. 39 will be described with reference to the flowchart in FIG. 40.

In step S91, the controller 51 determines whether or not the degree of dirt is mild on the basis of a result of dirt recognition by the sensor device 21.

If it has been determined in step S91 that the dirt to be cleaned is mild, in step S92, the controller 51 controls a cleaning unit disposed in the groove 281 to perform cleaning by spraying a detergent of an amount in accordance with the degree of dirt.

If it has been determined in step 391 that the dirt to be cleaned is not mild, in step 393, the controller 51 determines whether or not the type of dirt is grease on the basis of the result of dirt recognition by the sensor device 21.

If it has been determined in step 393 that the type of dirt is grease, in step 394, the controller 51 controls the cleaning unit disposed in the groove 281 to perform cleaning by spraying a detergent for grease. Note that the type of detergent to be used for cleaning may be allowed to be switched in accordance with which of the pieces of processing in steps S72 to S74 in FIG. 39 has been performed before the cleaning processing in FIG. 40. For example, in a case where it has been determined that the target of cleaning is a human hand and the processing of step S72 has been performed, a detergent for human hands is used in order not to cause skin roughness. Furthermore, in a case where it has been determined that the target of cleaning is tableware and the processing of step 373 has been performed, a detergent for tableware having strong cleaning power is used.

On the other hand, if it has been determined in step S93 that the type of dirt is not grease, in step S95, the controller 51 controls the cleaning unit disposed in the groove 281 to perform cleaning by spraying water.

After the target of cleaning in the groove 281 has been cleaned in steps S92, S94, and S95, the processing proceeds to step S96.

In step S96, the sensing control unit 582 of the sensor device 21 performs dirt recognition on the basis of an RGB image captured by the RGB camera 32A. The dirt recognition in step S96 is performed in a similar manner to the dirt recognition in steps S72, S73, and S74 in FIG. 39 with use of a sensing algorithm in accordance with the type of the target of cleaning.

In step S97, the controller 51 determines whether or not the dirt has been removed on the basis of a result of recognition by the sensor device 21. If it has been determined that the dirt has not been removed, the processing returns to step S91, and the processing described above is repeated.

Figure 39:
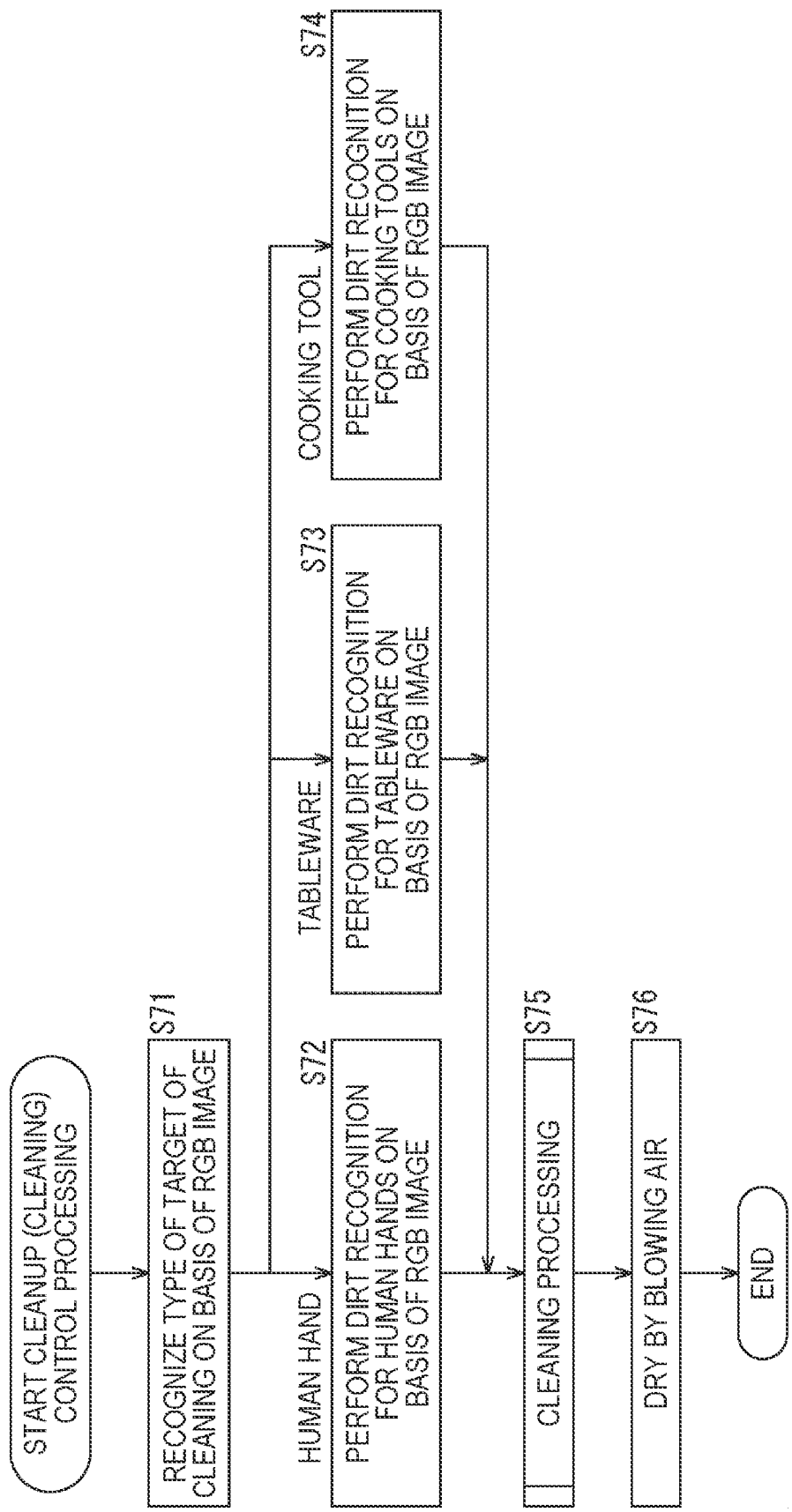
FIG. 39 is a flowchart illustrating processing of controlling cleanup by the cooking robot.
Figure 40:
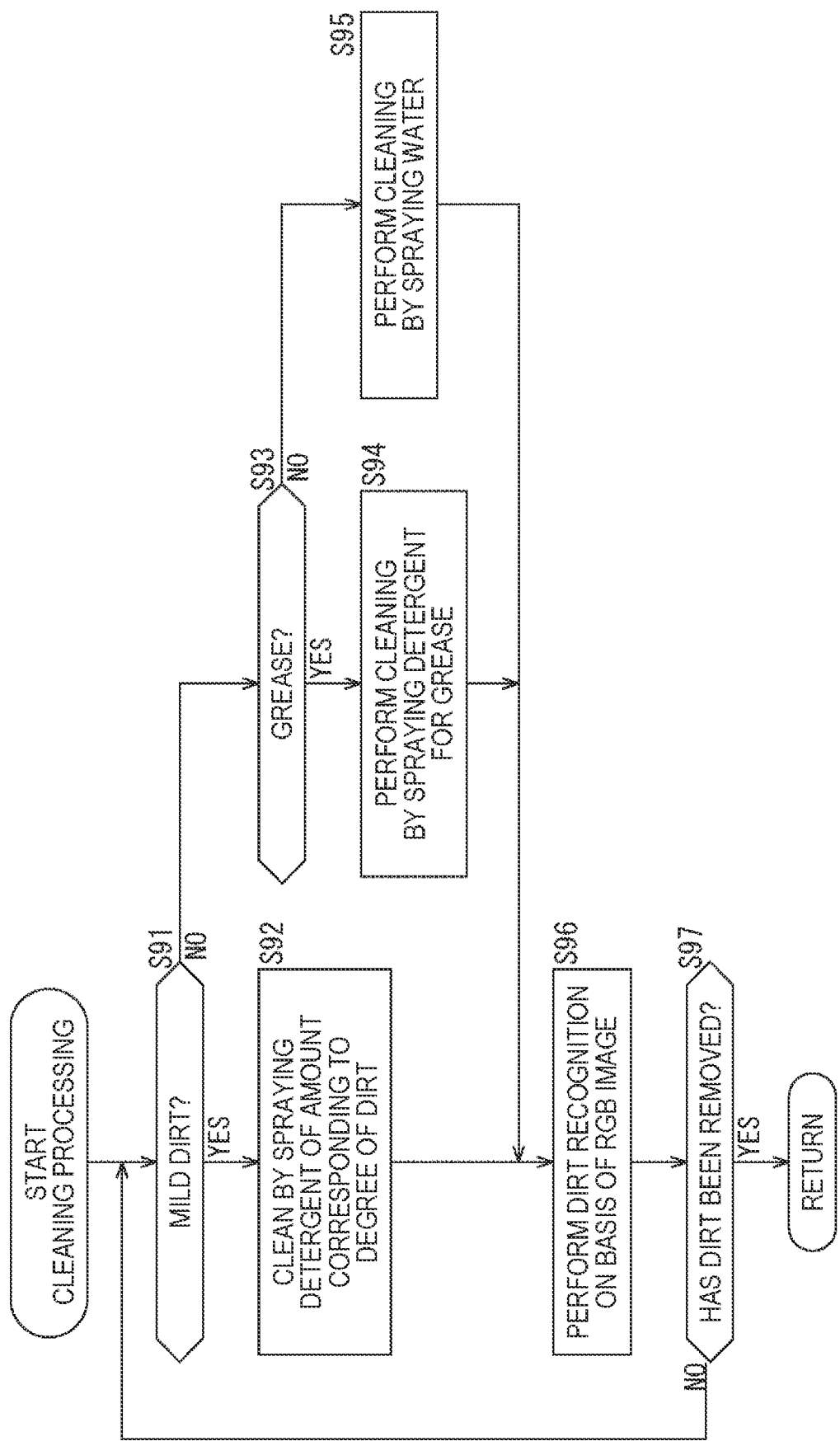
FIG. 40 is a flowchart illustrating cleaning processing performed in step S75 in FIG. 39.

If it has been determined in step S97 that the dirt has been removed, the processing returns to step S75 in FIG. 39, and the subsequent processing is performed.

With the above processing, the cooking robot 2-4 can select a sensing algorithm in accordance with the situation of the cooking process such as the type of the target to be cleaned, and perform object sensing. Furthermore, the cooking robot 2-4 can control the way of cleaning on the basis of a result of the object sensing performed with use of the sensing algorithm selected in accordance with such a situation of the cooking process.

Modified Examples

Example of Case where Sensing Algorithm is Selected from Outside

Selection of a sensing algorithm in accordance with the object sensing condition, which is performed in the sensor device 21, may alternatively be performed by a device outside the device on which the sensor device 21 is mounted.

Figure 41:
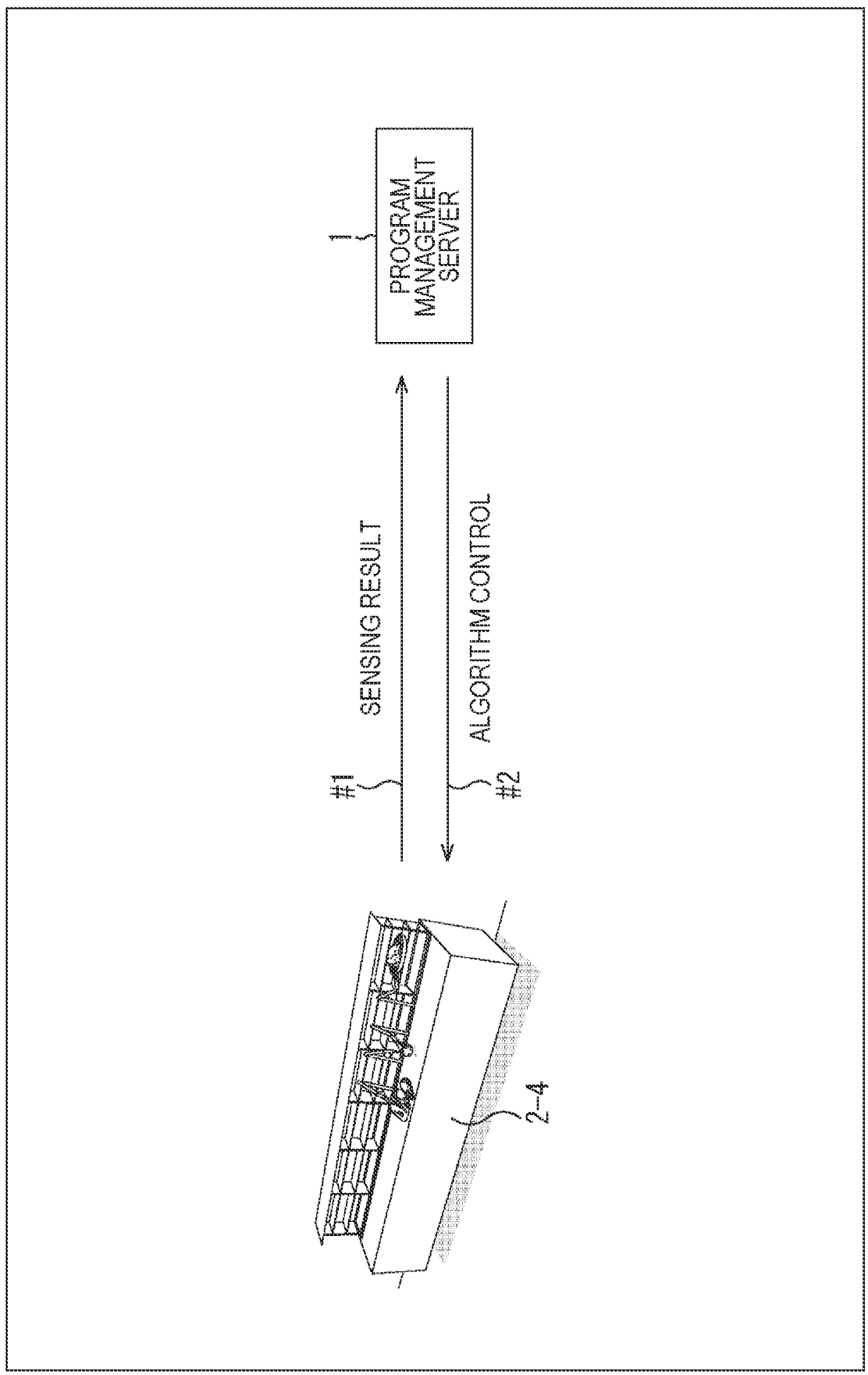
FIG. 41 is a diagram illustrating an example of control of the sensing algorithm.

FIG. 41 is a diagram illustrating an example of control of the sensing algorithm.

In the example in FIG. 41, selection of a sensing algorithm in accordance with the object sensing condition is performed by the program management server 1, which is a device on the outside. In this case, the controller 31 in FIG. 34 is configured in the program management server 1. The program management server 1 is a data processing device that controls a sensing program executed by the sensor device 21 mounted on the cooking robot 2-4.

As indicated by an arrow #1, sensor data used for detection of a situation is transmitted from the cooking robot 2-4 to the program management server 1, and a sensing program is requested.

The situation detection unit 581 of the program management server 1 detects the situation of the cooking operation of the cooking robot. 2-4 on the basis of the sensor data transmitted from the cooking robot 2-4. Furthermore, the sensing control unit 582 determines an object sensing condition in accordance with the situation of the cooking operation of the cooking robot 2-4, and a sensing algorithm is selected.

As indicated by an arrow #2, the sensing control unit. 582 of the program management server 1 transmits a sensing program that defines the sensing algorithm in accordance with the object sensing condition to the sensor device 21 mounted on the cooking robot 2-4, and causes the sensing program to be executed. In this case, the sensing control unit 582 of the program management server 1 functions as a data processing unit that transmits the sensing program that defines the sensing algorithm in accordance with the object sensing condition to the cooking robot 2-4.

As described above, the sensing algorithm may be controlled by a device outside the sensor device 21. For example, the controller 51 of the cooking robot 2-4 on which the sensor device 21 is mounted may be used as a device on the outside, and the sensing algorithm may be controlled by the controller 51.

The sensing program that defines the sensing algorithm in accordance with the object sensing condition may be executed by the program management server 1 or the controller 51 as a device on the outside, and information showing an execution result may be transmitted to the sensor device 21.

The program management server 1 in FIG. 41 has a configuration similar to the configuration of the data processing device 101 described with reference to FIG. 32.

Control of the sensing algorithm as described above is implemented by a predetermined program executed by a CPU of a computer constituting the program management server 1.

Example of Program

The series of processing described above can be executed not only by hardware but also by software. In a case where the series of processing is executed by software, a program constituting the software is installed on a computer built into dedicated hardware, a general-purpose personal computer, or the like.

The program to be installed is provided by being recorded in the removable medium 511 illustrated in FIG. 32 and constituted by an optical disk (compact disc-read only memory (CD-RCM), a digital versatile disc (DVD), or the like), a semiconductor memory, or the like. Furthermore, the program may be provided via a wired or wireless transmission medium such as a local area network, the Internet, or digital broadcasting. The program can be installed in advance in the ROM 502 or the storage unit 508.

Note that the program to be executed by the computer may be a program that performs the pieces of processing in chronological order as described in the present specification, or may be a program that performs the pieces of processing in parallel or when needed, for example, when the processing is called.

Note that, in the present specification, a system means a set of a plurality of components (devices, modules (parts), and the like), and it does not matter whether or not all components are in the same housing. Thus, a plurality of devices housed in separate housings and connected via a network, and one device having a plurality of modules housed in one housing are both systems.

The effects described herein are merely illustrative and are not intended to be restrictive, and other effects may be obtained.

Embodiments of the present technology are not limited to the embodiment described above but can be modified in various ways within a scope of the present technology.

For example, the present technology can have a cloud computing configuration in which a plurality of devices shares one function and collaborates in processing via a network.

Furthermore, each step described in the flowcharts described above can be executed by one device or can be shared by a plurality of devices.

Moreover, in a case where a plurality of pieces of processing is included in one step, the plurality of pieces of processing included in that step can be executed by one device or can be shared by a plurality of devices.

REFERENCE SIGNS LIST

1 Program management server
2-1 Mobile terminal
2-2 Arm robot
2-3 Mobile object
2-4 Cooking robot
2-5 Conveyance robot
21 Sensor device
31 Controller
32 Sensor group
51 Controller
581 Situation detection unit
582 Sensing control unit

The invention claimed is:

1. A data processing device comprising:
a robot state estimation unit configured to
estimate a state of a robot regarding operation information of a cooking process including cleaning an object, the state of the robot being estimated based on an output from a first sensor mounted on the robot, and
estimate a state around the robot based on an output from a second sensor mounted on the robot; and
a sensing control unit configured to
select an object sensing program in accordance with an object sensing condition based on the state of the robot and the state around the robot, and
execute the object sensing program, which defines an object sensing algorithm for sensing the object on a basis of sensor data output from at least one of the first sensor or the second sensor mounted on the robot is defined,
wherein the first sensor and the second sensor are different sensors,
wherein the state around the robot includes a state of a sensing target, the sensing target including the object cleaned in the cooking process, wherein the state of the sensing target includes information of a material of the object cleaned in the cooking process, and wherein the robot state estimation unit and the sensing control unit are each implemented via at least one processor.

2. The data processing device according to claim 1, wherein the sensing control unit selects the object sensing program acquired via a network.

3. The data processing device according to claim 1, wherein the sensing control unit selects the object sensing program to be executed from an object sensing program set that includes a combination of a plurality of the object sensing programs.

4. The data processing device according to claim 3, wherein the object sensing program set includes a combination of information showing types of the object sensing algorithms defined in the object sensing programs and information showing an order in which the object sensing programs are executed.

5. The data processing device according to claim 3, wherein the sensing control unit selects the object sensing program included in the object sensing program set acquired via a network.

6. The data processing device according to claim 5, wherein the sensing control unit selects the object sensing program set with use of identification data for identifying the object sensing program set.

7. The data processing device according to claim 3, wherein the object sensing algorithms defined in the plurality of the object sensing programs are algorithms applied to sensor data output by setting different parameters to the same sensor or sensor data output by setting the same parameter to the same sensor.

8. The data processing device according to claim 3, wherein the object sensing algorithms defined in the plurality of the object sensing programs are algorithms applied to sensor data output from different sensors.

9. The data processing device according to claim 8, wherein at least either the object sensing programs or the object sensing algorithms defined in the object sensing programs are associated with sensors, and the sensing control unit controls operations of a plurality of the sensors in conjunction with selection and execution of the object sensing programs.

10. A data processing method comprising:
by a data processing device,
estimating a state of a robot regarding operation information of a cooking process including cleaning an object, the state of the robot being estimated based on an output from a first sensor mounted on the robot;
estimating a state around the robot based on an output from a second sensor mounted on the robot;
selecting an object sensing program in accordance with an object sensing condition based on the state of the robot and the state around the robot, the object sensing program defining an object sensing algorithm for sensing the object on a basis of sensor data output from at least one of the first sensor or the second sensor mounted on the robot; and
transmitting the selected object sensing program to the robot,
wherein the first sensor and the second sensor are different sensors,
wherein the state around the robot includes a state of a sensing target, the sensing target including the object cleaned in the cooking process, and
wherein the state of the sensing target includes information of a material of the object cleaned in the cooking process.

11. The data processing device according to claim 1, wherein the state of the sensing target further includes information of at least one of a type, a degree of dirt, or a degree of dryness of the object cleaned in the cooking process.

12. The data processing device according to claim 11, wherein the sensing target further includes a specific part of a person.

13. The data processing device according to claim 11, wherein the sensing target further includes at least one of an ingredient or a tool for cooking.

14. The data processing device according to claim 11, wherein the state of the sensing target further includes a position of the sensing target.

15. The data processing device according to claim 1, wherein the state around the robot further includes information of at least one of weather, temperature, or humidity around the robot.

16. The data processing device according to claim 1, wherein the state of the robot further includes at least one of information of an angular velocity of a part of the robot, information of an acceleration of the part of the robot, or information of object gripping.

17. The data processing device according to claim 1, wherein the first sensor includes at least one of a gyro sensor, an acceleration sensor, a touch sensor, or a pressure sensor.

18. The data processing device according to claim 1, wherein the second sensor includes at least one of an image sensor, a temperature and humidity sensor, an optical sensor, a distance sensor, a human detection sensor, a positioning sensor, or a vibration sensor.

* * * * *